(12) United States Patent
Mihai

(10) Patent No.: US 11,945,577 B2
(45) Date of Patent: Apr. 2, 2024

(54) AERIAL VEHICLES WITH TRANSITIONING LANDING GEAR AND RELATED METHODS

(71) Applicant: Insitu, Inc. a subsidiary of The Boeing Company, Bingen, WA (US)

(72) Inventor: Ovidiu Cristian Mihai, Sammamish, WA (US)

(73) Assignee: INSITU, INC., a subsidiary of THE BOEING COMPANY, Bingen, WA (US)

(*) Notice: Subject to any disclaimer, the term of this patent is extended or adjusted under 35 U.S.C. 154(b) by 27 days.

(21) Appl. No.: 17/748,778

(22) Filed: May 19, 2022

(65) Prior Publication Data
US 2022/0411047 A1    Dec. 29, 2022

Related U.S. Application Data

(60) Provisional application No. 63/214,449, filed on Jun. 24, 2021.

(51) Int. Cl.
*B64C 29/00* (2006.01)
*B64C 25/20* (2006.01)

(52) U.S. Cl.
CPC .......... *B64C 29/0033* (2013.01); *B64C 25/20* (2013.01)

(58) Field of Classification Search
CPC .................................................. B64C 29/0033
See application file for complete search history.

(56) References Cited

U.S. PATENT DOCUMENTS

| | | | | |
|---|---|---|---|---|
| 3,254,725 A | * | 6/1966 | Higgins | B64C 29/0033 416/169 R |
| 4,537,372 A | * | 8/1985 | Forizs | B64C 29/0033 244/66 |
| 5,395,073 A | * | 3/1995 | Rutan | B64C 29/02 244/38 |
| 10,301,016 B1 | * | 5/2019 | Bondarev | B64C 29/0033 |

OTHER PUBLICATIONS

U.S. Appl. No. 17/482,258, filed Sep. 21, 2021, Wong.

* cited by examiner

*Primary Examiner* — Nicholas McFall
(74) *Attorney, Agent, or Firm* — Kolitch Romano Dascenzo Gates LLC

(57) ABSTRACT

Aerial vehicles may be selectively transitioned between a fixed wing flight configuration and a vertical takeoff and landing (VTOL) configuration. In the fixed wing flight configuration, a forward propeller may rotate in a first forward plane, whereas in the VTOL configuration, the forward propeller may be tilted to rotate in a second forward plane. A forward landing arm may extend downward in the VTOL configuration and be configured to be tilted to a stowed position when the aerial vehicle is in the fixed wing flight configuration. The forward landing arm may be coupled to the forward propeller such that tilting of the forward propeller causes corresponding tilting of the forward landing arm. In some examples, a plurality of such landing arms and propellers are tilted during transitioning of the aerial vehicle, such as one or more forward propellers and landing arms and/or one or more aft propellers and landing arms.

20 Claims, 12 Drawing Sheets

AERIAL VEHICLES WITH TRANSITIONING LANDING GEAR AND RELATED METHODS

RELATED APPLICATION

The present application is a non-provisional of and claims priority to U.S. Provisional Patent Application No. 63/214,449, filed on Jun. 24, 2021, entitled "AERIAL VEHICLES WITH TRANSITIONING LANDING GEAR AND RELATED METHODS," the complete disclosure of which is incorporated by reference.

FIELD

The present disclosure relates generally to aerial vehicles with transitioning landing gear, and more particularly to aerial vehicles configured to be selectively transitioned between a fixed wing flight configuration and a vertical takeoff and landing (VTOL) configuration via movement of one or more landing arms and propellers.

BACKGROUND

Typical conventional VTOL aerial vehicles lift off with rotors dedicated to takeoff and landing, and use a "sled" or two long "skis" similar to typical helicopter landing gear for landing. Such structures disadvantageously produce a significant amount of drag when the aerial vehicle is in flight. Some fixed wing aircraft have retractable landing gear to reduce drag that would otherwise be caused by the landing gear, though VTOL aircraft are not equipped with such retractable landing gear. The fixed wing aircraft with retractable landing gear require additional actuation systems and structural members to retract the landing gear.

In some hybrid aircraft, rotors may be rotated from their vertical flight configuration to a horizontal flight configuration for horizontal motion of the aircraft, though these hybrid aircraft employ landing gear to protect and balance the aircraft while it is on the ground and/or when it is landing and taking off. The same propulsion modules (engine/motor and propeller) are used for vertical flight and fixed wing flight, with the general approach being to use typical helicopter-style landing gear and accept the penalty of the aerodynamic drag of that structure. These fixed landing gear structures are always exposed to airflow and thus cause drag during both VTOL and fixed wing flight modes.

SUMMARY

Disclosed aerial vehicles may be configured to be selectively transitioned between a fixed wing flight configuration and a vertical takeoff and landing (VTOL) configuration. An exemplary aerial vehicle may include a forward and aft propeller, and a forward and aft landing arm. The forward propeller may be configured to rotate (e.g., spin, thereby producing lift and/or motion of the aerial vehicle) when the aerial vehicle is in the fixed wing flight configuration and when the aerial vehicle is in the VTOL configuration. In the fixed wing flight configuration, the forward propeller may rotate in a first forward plane, whereas in the VTOL configuration, the forward propeller may be tilted such that the forward propeller rotates in a second forward plane. Said first forward plane may be arranged at a first non-parallel angle with respect to the second forward plane. The aft propeller also may be configured to rotate at least when the aerial vehicle is in the VTOL configuration.

The forward landing arm may be configured to be tilted to a stowed position when the aerial vehicle is in the fixed wing flight configuration, and may be coupled to the forward propeller such that tilting of the forward propeller causes corresponding tilting of the forward landing arm. The forward landing arm and the aft landing arm may be configured to extend downwardly when the aerial vehicle is in the VTOL configuration, such that the forward landing arm and the aft landing arm at least partially support the aerial vehicle when the aerial vehicle is in the VTOL configuration and lands on a landing surface. In some examples, a plurality of such landing arms and propellers are tilted during transitioning of the aerial vehicle. Such aerial vehicles may be configured to be selectively transitioned back and forth between the VTOL configuration and the fixed wing flight configuration, as many times as desired during use of the aerial vehicle. In other words, the transitioning between the VTOL configuration and the fixed wing flight configuration may be said to be selectively reversible.

Related methods may include configuring the aerial vehicle for vertical takeoff or landing, such as by positioning at least one landing arm such that it extends downwardly from the aerial vehicle, and tilting the at least one landing arm together with at least one propeller to configure the aerial vehicle for fixed wing flight, wherein each respective landing arm of the at least one landing arm may be coupled to a respective propeller of the at least one propeller. Methods also may include tilting the at least one landing arm and the at least one propeller in the opposite direction to again configure the aerial vehicle for VTOL (e.g., thereby placing the aerial vehicle in the VTOL configuration).

DESCRIPTION

Figure 1:
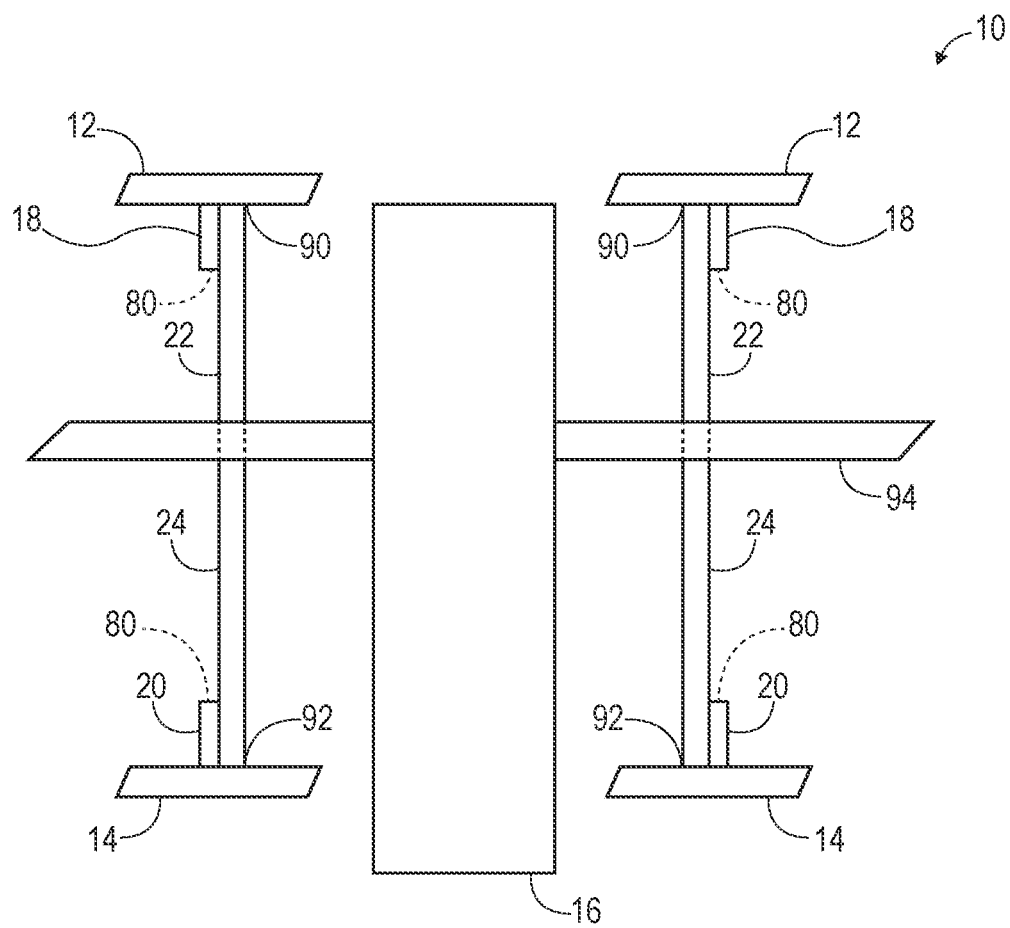
FIG. 1 is a schematic black box representation of nonexclusive examples of aerial vehicles according to the present disclosure.

FIG. 1 provides illustrative, non-exclusive examples of aerial vehicle 10 according to the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

FIG. 1 schematically represents examples of aerial vehicle 10, which may be selectively transitioned between a fixed wing flight configuration and a vertical takeoff and landing (VTOL) configuration. Aerial vehicle 10 generally includes one or more forward propellers 12 and one or more aft propellers 14. Forward propeller 12 rotates when aerial vehicle 10 is in the fixed wing flight configuration and when aerial vehicle 10 is in the VTOL configuration, and aft propeller 14 rotates at least when aerial vehicle 10 is in the VTOL configuration and/or when aerial vehicle 10 is in the fixed wing flight configuration. To transition aerial vehicle 10 between the two configurations, forward propeller 12 and/or aft propeller 14 may be tilted with respect to a main body 16 of aerial vehicle 10 to change the direction of the propulsion or lift force created by propellers 12 and/or 14, and therefore allow aerial vehicle 10 to perform vertical takeoff and landing in the VTOL configuration, and to perform fixed wing flight in the fixed wing flight configuration. For example, in the fixed wing flight configuration, forward propeller 12 rotates in a first forward plane, whereas in the VTOL configuration forward propeller 12 is tilted such that forward propeller 12 rotates in a second forward plane. Such first and second forward planes are arranged at a non-parallel angle with respect to each other.

Aerial vehicle 10 also includes at least one forward landing arm 18 and at least one aft landing arm 20. When aerial vehicle 10 is transitioned between the VTOL configuration and the fixed wing flight configuration, forward landing arm 18 and/or aft landing arm 20 also may be tilted, along with forward propeller 12 and/or aft propeller 14. For example, forward landing arm 18 is tilted to a stowed position (which also may be referred to as a retracted position) when aerial vehicle 10 is in the fixed wing flight configuration, though forward landing arm 18 is coupled to forward propeller 12 such that tilting of forward propeller 12 to transition aerial vehicle 10 also causes corresponding tilting of forward landing arm 18. Forward landing arm 18 and aft landing arm 20 extend downwardly when aerial vehicle 10 is in the VTOL configuration. In this manner, forward landing arm 18 and aft landing arm 20 at least partially support aerial vehicle 10 when aerial vehicle 10 is in the VTOL configuration and lands on a landing surface. In other words, landing arms 18, 20 generally contact the landing surface when aerial vehicle 10 lands and support main body 16 above the landing surface. In the stowed position, landing arms 18 and/or 20 may be tilted, or folded, such that they no longer extend downwardly towards the landing surface, and are stowed to reduce drag when aerial vehicle 10 is in the fixed wing flight configuration. In some examples, landing arms 18, 20 and propellers 12, 14 may be in the VTOL configuration to land aerial vehicle 10 and may be transitioned to the fixed wing flight configuration by tilting propellers 12 and/or 14 and tilting landing arms 18 and/or 20 once aerial vehicle 10 has taken off and has sufficient altitude above the landing surface. In this manner, aerial vehicle 10 may be configured such that forward landing arm 18 and/or aft landing arm 20 produce less drag when aerial vehicle 10 is in the fixed wing flight configuration than when aerial vehicle 10 is in the VTOL configuration.

Thus, disclosed aerial vehicles 10 may be said to be a hybrid aircraft, with the same propeller or propellers (forward propeller 12 and/or aft propeller 14) being used in both VTOL and in fixed wing flight. Landing gear structures (e.g., landing arms 18 and 20) are incorporated with propellers 12, 14 such that additional parts may be minimized, aircraft weight may be reduced or minimized, manufacturing costs may be reduced, part counts may be reduced, and/or drag may be reduced, as compared to aircraft with conventional retractable landing gear or fixed landing gear. Because landing arms 18 and/or 20 may be tilted when aerial vehicle 10 is transitioned between configurations, drag may be reduced in both the VTOL configuration and in the fixed wing flight configuration.

The landing arms 18, 20 and propeller 12, 14 systems disclosed herein may be incorporated in any VTOL aircraft, both manned and unmanned. The arrangement of presently disclosed propellers 12, 14 and landing arms 18, 20 may enable or facilitate small platform operations and/or the use of simpler mechanisms, which may be especially important in the case of unmanned aerial vehicles. Due to the way landing arms 18, 20 are integrated with propellers 12, 14, presently disclosed aerial vehicles 10 may be configured to keep landing arms 18, 20 aligned with the thrust direction of the aircraft's propulsion system in both the VTOL and fixed wing flight configurations.

In various examples of aerial vehicle 10, different combinations of propellers 12, 14 may be configured to rotate in the different configurations of aerial vehicle 10. In some examples, one or more aft propellers 14 may rotate in both the VTOL configuration and the fixed wing flight configurations. Similar to forward propeller 12, in examples where one or more aft propellers 14 are tilted when aerial vehicle 10 is transitioned between configurations, aft propeller 14 may rotate in a first aft plane when aerial vehicle 10 is in the fixed wing flight configuration, and aft propeller 14 may be tilted when aerial vehicle 10 is in the VTOL configuration such that aft propeller 14 rotates in a second aft plane. The first aft plane may be arranged at a second non-parallel angle with respect to the second aft plane. Also similar to forward propeller 12 and forward landing arm 18, aft landing arm 20 may be coupled to aft propeller 14 such that tilting of aft propeller 14 causes corresponding tilting of aft landing arm 20. In some examples, one or more aft propellers 14 may rotate in the VTOL configuration, but not when aerial vehicle 10 is in the fixed wing flight configuration. For example, one or more aft propellers 14 may be folded (e.g., via spring-loaded blades) such that they are passive, or do not rotate, when aerial vehicle 10 is in the fixed wing flight configuration.

Each respective forward landing arm 18 is at least substantially fixed with respect to a respective forward propeller 12, in some examples of aerial vehicle 10. Additionally or alternatively, each respective aft landing arm 20 may be at least substantially fixed with respect to a respective aft propeller 14. As noted, aerial vehicle 10 may include a plurality of forward propellers 12 and/or a plurality of aft propellers 14. In an illustrative example, aerial vehicle 10 may include a first and second forward propeller 12, and a first and second aft propeller 14. Similarly, aerial vehicle 10 may include corresponding first and second forward landing arms 18 and/or first and second aft landing arms 20. In some such examples, first forward landing arm 18 may be coupled to first forward propeller 12, second forward landing arm 18 may be coupled to second forward propeller 12, first aft landing arm 20 may be coupled to first aft propeller 14, and/or second aft landing arm 20 may be coupled to second aft propeller 14.

Some examples of aerial vehicle 10 include a forward elongated member 22 and/or an aft elongated member 24. In such examples, forward propeller 12 may be coupled to forward elongated member 22, and/or aft propeller 14 may be coupled to aft elongated member 24. Forward elongated member 22 and aft elongated member 24 may be integrally formed, may be separate structures, and/or may be coupled together. Additionally or alternatively, forward elongated member 22 may be at least substantially parallel to aft elongated member 24, and/or forward elongated member 22 may be coupled to and/or fixed with respect to aft elongated member 24. In some examples, aerial vehicle 10 includes two or more forward elongated members 22 and/or two or more aft elongated members 24. In some examples, aerial vehicle 10 includes a respective forward elongated member 22 for each respective forward propeller 12, and/or aerial vehicle 10 may include a respective aft elongated member 24 for each respective aft propeller 14. Forward elongated member 22 and/or aft elongated member 24 may be coupled to main body 16 of aerial vehicle 10, and/or may be coupled to a wing 94 of aerial vehicle 10 that provides lift to aerial vehicle 10 when aerial vehicle 10 is in the fixed wing flight configuration.

In some examples, forward landing arm 18 may be engaged with and/or secured against forward elongated member 22 when aerial vehicle 10 is in the fixed wing flight configuration. Additionally or alternatively, aft landing arm 20 may be engaged with and/or secured against aft elongated member 24 when aerial vehicle 10 is in the fixed wing flight configuration. Each forward landing arm 18 and/or aft landing arm 20 may include a respective landing foot 80 to increase compliance and/or stability of aerial vehicle 10 on variable terrain and different landing surfaces.

Each respective forward propeller 12 and forward landing arm 18 may be coupled to each other and/or to forward elongated member 22 by any suitable mechanism, including but not limited to a respective forward revolution joint 90 (e.g., a pin extending through a hole). Similarly, each respective aft propeller 14 and aft landing arm 20 may be coupled to each other and/or to aft elongated member 24 by any suitable mechanism, including but not limited to a respective aft revolution joint 92. In various examples of aerial vehicle 10, tilting of forward propellers 12 and forward landing arms 18 may be triggered, or determined, by a mechanism actuated by an electromagnetic motor, a hydraulic actuation system, and/or a pneumatic actuation system. Similarly, tilting of aft propellers 14 and aft landing arms 20 may be triggered, or determined, by a mechanism actuated by an electromagnetic motor, a hydraulic actuation system, and/or a pneumatic actuation system. In some examples of aerial vehicle 10, a single mechanism may trigger tilting of all landing arms 18, 20 and propellers 12, 14, to effectuate transitioning of aerial vehicle 10 between the VTOL configuration and the fixed wing flight configuration, whereas in other examples, separate mechanisms may be included to actuate forward landing arms 18 and aft landing arms 20. In other words, aerial vehicle 10 may include a forward actuation mechanism configured to actuate (e.g., tilt) forward landing arms 18 and forward propellers 12, and a second actuation mechanism configured to actuate aft landing arms 20 and aft propellers 14. In some examples, such triggering of the tilting of landing arms 18, 20 and propellers 12, 14 may be a manual triggering performed by a pilot, crew member, or remote operator. Additionally or alternatively, such triggering of the tilting of landing arms 18, 20 and propellers 12, 14 may occur automatically, such as via an autopilot system, altitude detectors, and/or onboard processing units. In various examples of aerial vehicle 10, the mechanisms for tilting landing arms 18, 20 and propellers 12, 14 may include an electromechanical motor with a lead screw and/or a hydraulic actuator. Some aerial vehicles 10 may include a locking mechanism, such as a retractable pin assembly, configured to prevent accidental transitioning of aerial vehicle 10 from one configuration to the other.

Turning now to FIGS. 2-18, illustrative non-exclusive examples of aerial vehicles 10, or portions thereof, are illustrated. Where appropriate, the reference numerals from the schematic illustration of FIG. 1 are used to designate corresponding parts of FIGS. 2-18; however, the examples of FIGS. 2-18 are non-exclusive and do not limit aerial vehicles 10 to the illustrated examples of FIGS. 2-18. That is, aerial vehicles 10 are not limited to the specific examples of the illustrated FIGS. 2-18 and may incorporate any number of the various aspects, configurations, characteristics, properties, etc. of aerial vehicles 10 that are illustrated in and discussed with reference to the schematic representation of FIG. 1 and/or the examples of FIGS. 2-18, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in each of the examples of FIGS. 2-18; however, it is within the scope of the present disclosure that the previously discussed features, variants, etc. may be utilized therewith.

Figure 2:
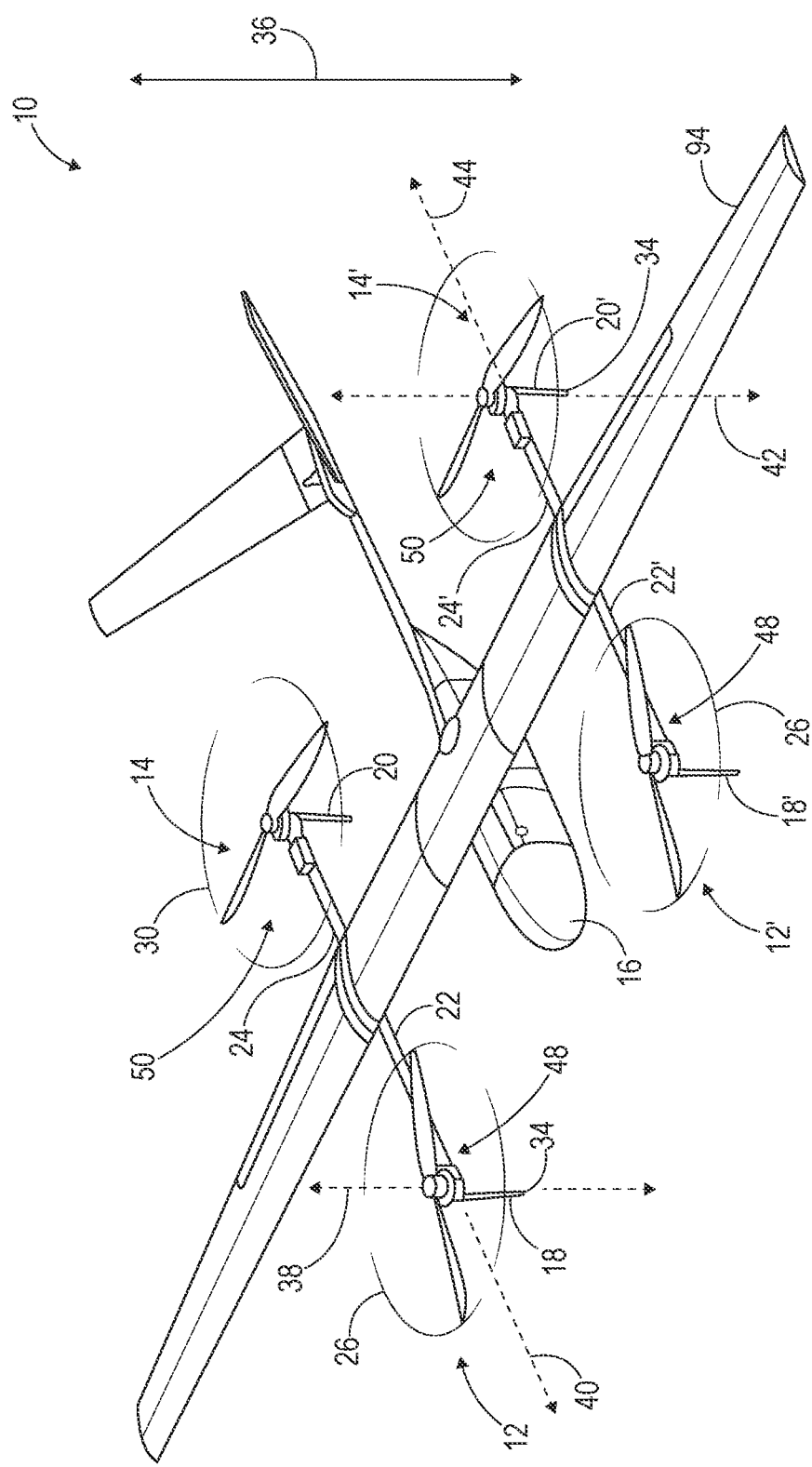
FIG. 2 is a perspective view of an example of an aerial vehicle according to the present disclosure in a vertical takeoff and landing configuration.
Figure 3:
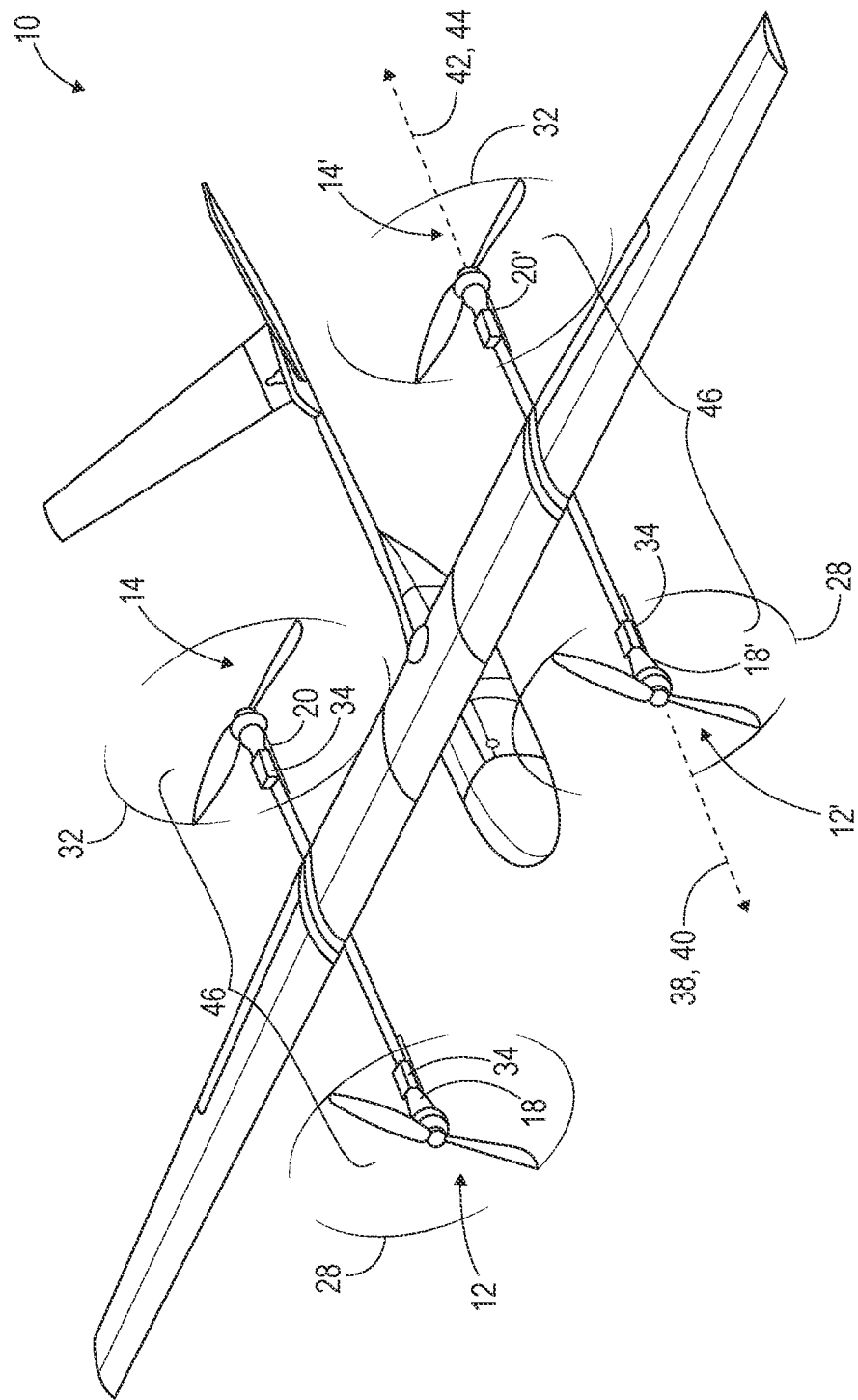
FIG. 3 is a perspective view of an example of an aerial vehicle according to the present disclosure in a fixed wing flight configuration.

FIGS. 2-3 illustrate an example of aerial vehicle 10 with first forward propeller 12, first forward landing arm 18, first forward elongated member 22, second forward propeller 12', second forward landing arm 18', second forward elongated member 22', first aft propeller 14, first aft landing arm 20, first aft elongated member 24, second aft propeller 14', second aft landing arm 20', and second aft elongated member 24'. As shown in FIGS. 2-3, first forward landing arm 18 is coupled to first forward propeller 12, both of which are coupled to first forward elongated member 22. Similarly, second forward landing arm 18' is coupled to second forward propeller 12', both of which are coupled to second forward elongated member 22'. The setup in this example is similar for the aft section of aerial vehicle 10: first aft landing arm 20 is coupled to first aft propeller 14, both of which are coupled to first aft elongated member 24, and second aft landing arm 20' is coupled to second aft propeller 14', both of which are coupled to second aft elongated member 24'. FIG. 2 illustrates aerial vehicle 10 in the VTOL configuration, while FIG. 3 illustrates aerial vehicle 10 in the fixed wing flight configuration.

As shown in FIG. 2, first and second forward propellers 12, 12' may rotate in a first forward plane 26 in the VTOL configuration, whereas first and second forward propellers 12, 12' may rotate in a second forward plane 28 in the fixed wing flight configuration shown in FIG. 3. In other words, tilting of first and second forward propellers 12, 12' to transition aerial vehicle 10 from the VTOL configuration to the fixed wing flight configuration (or vice versa) includes tilting first and second forward propellers 12, 12' such that they rotate in a different plane in the different configurations. First and second forward propellers 12, 12' generally rotate in the same first forward plane 26, though in some examples may rotate in different respective first forward planes 26 (though in these cases the first forward planes 26 may be parallel to one another). First forward plane 26 is arranged at a non-parallel angle to second forward plane 28, and in some examples, first forward plane 26 may be substantially perpendicular to second forward plane 28.

In the example of FIGS. 2-3, first and second aft propellers 14, 14' may rotate in a first aft plane 30 in the VTOL configuration shown in FIG. 2, and may rotate in a second aft plane 32 in the fixed wing flight configuration of FIG. 3. In other words, tilting of first and second aft propellers 14, 14' to transition aerial vehicle 10 from the VTOL configuration to the fixed wing flight configuration (or vice versa) includes tilting first and second aft propellers 14, 14' such that they rotate in a different plane in the different configurations. First and second aft propellers 14, 14' generally rotate in the same first aft plane 30, though in some examples may rotate in different respective first aft planes 30 (though in these cases the first aft planes 30 may be parallel to one another). Similar to first and second forward planes 26, 28, first aft plane 30 is arranged at a non-parallel angle to second aft plane 32, and in some examples, first aft plane 30 may be substantially perpendicular to second aft plane 32.

As shown in FIG. 2, in the VTOL configuration, first forward landing arm 18, second forward landing arm 18', first aft landing arm 20, and second aft landing arm 20' all may extend downward (e.g., may be oriented facing a landing surface on which aerial vehicle 10 is configured to land). To transition aerial vehicle 10 to the fixed wing flight configuration of FIG. 3, landing arms 18, 18', 20, and 20' may be tilted, along with the propellers 12, 12', 14, and 14'. In the example of FIGS. 2-3, first forward landing arm 18 and second forward landing arm 18' are tilted in the fixed wing flight configuration, such that they are in a stowed position (FIG. 3) in which they are at least substantially parallel to first forward elongated member 22 and second forward elongated member 22', respectively. Similarly, first aft landing arm 20 and second aft landing arm 20' may be tilted in the fixed wing flight configuration such that they are in a stowed position (FIG. 3) in which they are at least substantially parallel to first aft elongated member 24 and second aft elongated member 24', respectively. Additionally or alternatively, a respective lower end 34 of each landing arm 18, 18', 20, and/or 20' may be angled away from the landing surface for aerial vehicle 10 in the fixed wing flight configuration (FIG. 3). Put another way, in the fixed wing flight configuration (FIG. 3), lower end 34 of each of forward landing arms 18, 18' and aft landing arms 20, 20' may be angled away from a vertical axis 36 (FIG. 2) along which aerial vehicle 10 is configured to move in the VTOL configuration.

Additionally or alternatively, in some examples, a longitudinal axis 38 of forward landing arms 18, 18' may be at least substantially perpendicular to a longitudinal axis 40 forward elongated members 22, 22', when aerial vehicle 10 is in the VTOL configuration (FIG. 2), whereas longitudinal axis 38 of forward landing arms 18, 18' may be at least substantially parallel to longitudinal axis 40 of forward elongated members 22, 22' when aerial vehicle 10 is in the fixed wing flight configuration (FIG. 3), due to tilting of forward landing arms 18, 18' when aerial vehicle 10 is transitioned between configurations. Similarly, a longitudinal axis 42 of aft landing arms 20, 20' may be at least substantially perpendicular to a longitudinal axis 44 of aft elongated members 24, 24', when aerial vehicle 10 is in the VTOL configuration (FIG. 2), whereas longitudinal axis 42 of aft landing arms 20, 20' may be at least substantially parallel to longitudinal axis 44 of aft elongated members 24, 24' when aerial vehicle 10 is in the fixed wing flight configuration (FIG. 3).

In some examples of aerial vehicle 10, first forward elongated member 22 may be integrally formed with first aft elongated member 24 to form a first lift boom 46, and/or second forward elongated member 22' may be integrally formed with second aft elongated member 24' to form a second lift boom 46'. Lift booms 46, 46' may extend from a leading edge region 48 to a trailing edge region 50. It also may be said that forward elongated member 22 forms leading edge region 48 of lift boom 46 and aft elongated member 24 forms trailing edge region 50 of lift boom 46, in examples including lift boom 46. In some examples, forward propellers 12, 12' may be coupled within leading edge region of lift booms 46, 46', respectively, and/or aft propellers 14, 14' may be coupled within trailing edge region 50 of lift booms 46, 46', respectively.

Figure 4:
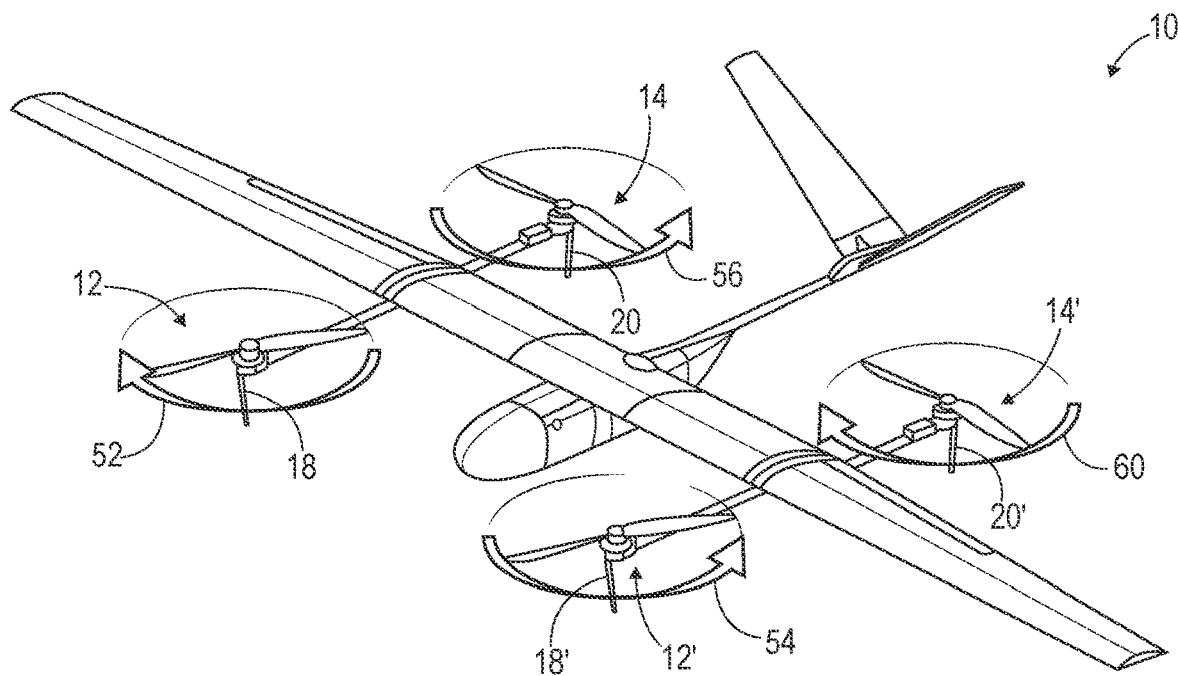
FIG. 4 is a perspective view of an example of an aerial vehicle according to the present disclosure in a vertical takeoff and landing configuration.
Figure 5:
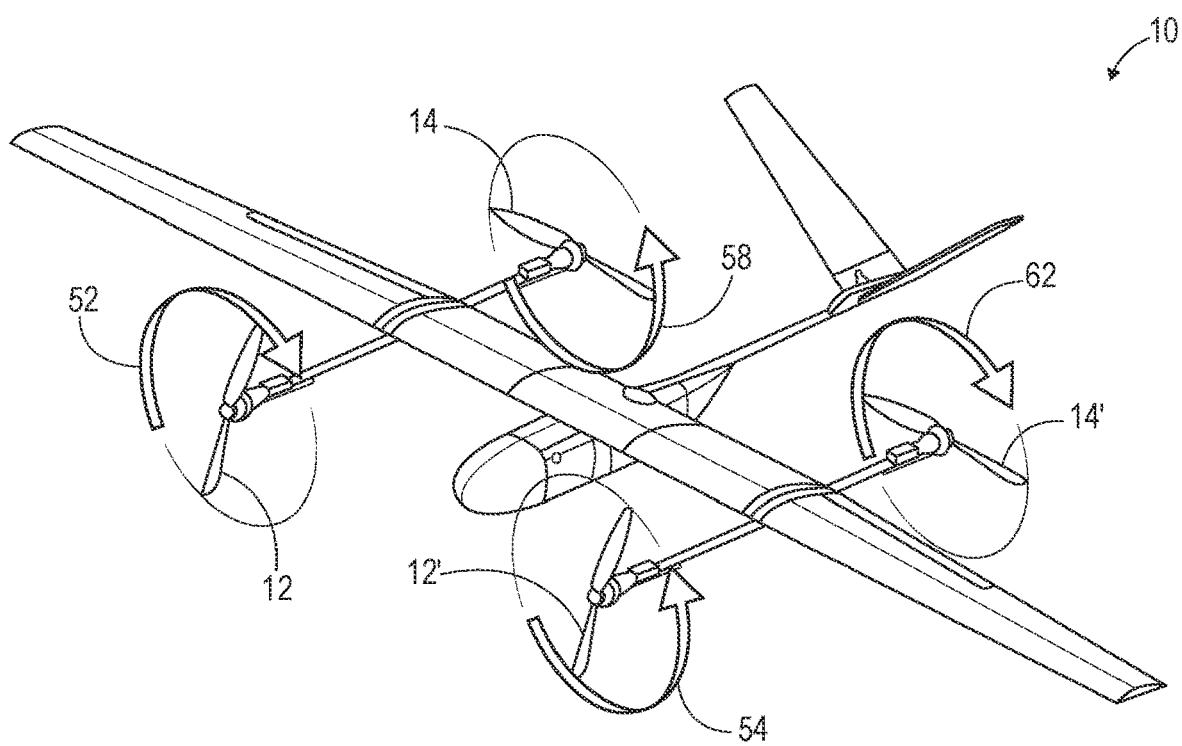
FIG. 5 is a perspective view of an example of an aerial vehicle according to the present disclosure in a fixed wing flight configuration.

FIGS. 4-5 illustrate an example of the configuration of FIGS. 2-3, showing relative directions of spin of forward propellers 12, 12' and aft propellers 14, 14'. In this example, first forward propeller 12 and second forward propeller 12' are configured to maintain their respective spinning directions in both the VTOL configuration (FIG. 4) and the fixed wing flight configuration (FIG. 5). For example, a first spinning direction (indicated by arrow 52) of first forward propeller 12 is the same in the VTOL configuration and the fixed wing flight configuration, even though first forward propeller 12 is tilted to transition aerial vehicle 10 between configurations. Similarly, a second spinning direction (indicated by arrow 54) of second forward propeller 12' is the same in the VTOL configuration and the fixed wing flight configuration, even though second forward propeller 12' also is tilted between configurations. On the other hand, in this example, first aft propeller 14 and second aft propeller 14' are configured to spin in a respective reverse direction in the VTOL configuration than in the fixed wing flight configuration. For example, a spinning direction of first aft propeller 14 in the VTOL configuration of FIG. 4 (indicated by arrow 56) is opposite, or the reverse of, the spinning direction of first aft propeller 14 in the fixed wing flight configuration of FIG. 5 (indicated by arrow 58). Similarly, a spinning direction of second aft propeller 14' in the VTOL configuration (indicated by arrow 60 in FIG. 4) is opposite, or the reverse of, the spinning direction of second aft propeller in the fixed wing flight configuration (indicated by arrow 62 in FIG. 5). In these examples, spinning of aft propellers 14, 14' may be stopped before, during, or after the transition of aerial vehicle 10 between the VTOL and fixed wing flight configurations, to reverse the spin direction of aft propellers 14, 14'.

Figure 6:
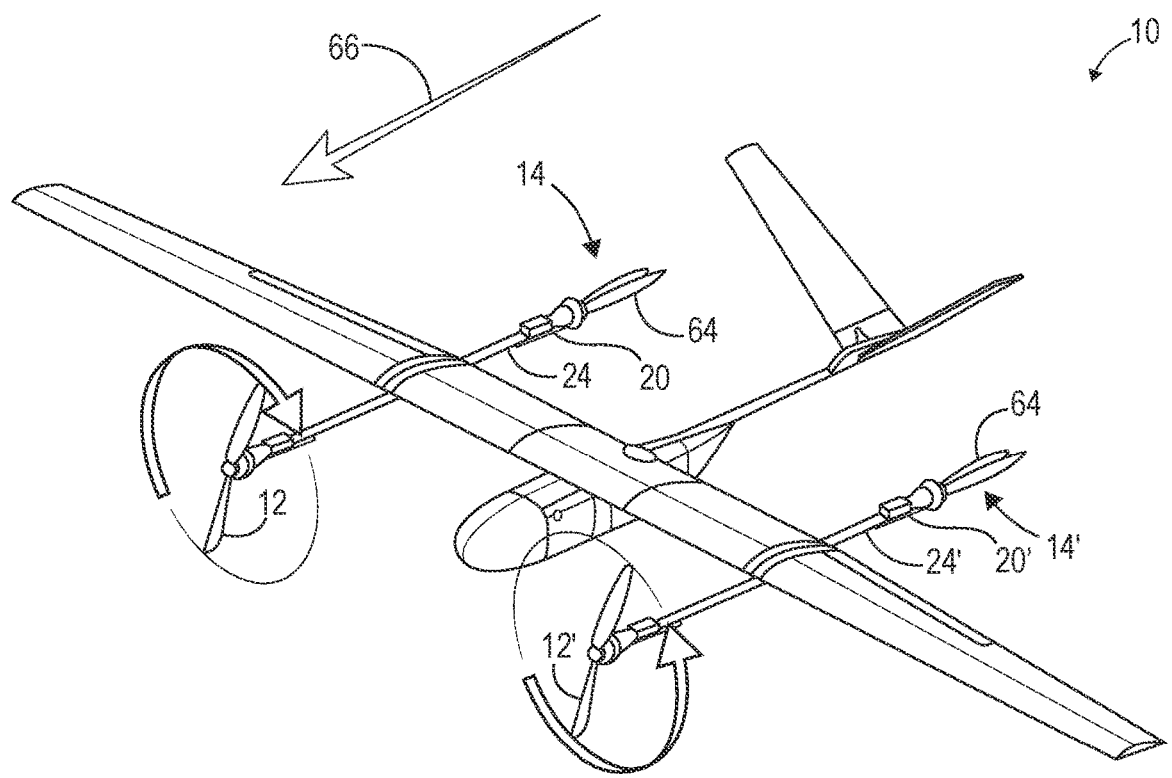
FIG. 6 is a perspective view of an example of an aerial vehicle according to the present disclosure in a fixed wing flight configuration, with spring loaded aft propellers.

In the example of FIGS. 2-5, first forward propeller 12, second forward propeller 12', first aft propeller 14, and second aft propeller 14' all are configured to spin, or rotate to propel aerial vehicle 10 in both the VTOL configuration and the fixed wing flight configuration. In other examples of aerial vehicle 10, first forward propeller 12, second forward propeller 12', first aft propeller 14, and second aft propeller 14' are all configured to spin when aerial vehicle 10 is in the VTOL configuration, though only first forward propeller 12 and second forward propeller 12' are configured to spin in the fixed wing flight configuration. For example, FIG. 6 shows another example of aerial vehicle 10 in the fixed wing flight configuration. In the example of FIG. 6, first aft propeller 14 and second aft propeller 14' are substantially stationary in the fixed wing flight configuration (e.g., are not spinning or rotating). In some examples, blades 64 of first aft propeller 14 and second aft propeller 14' are oriented at least substantially parallel to a direction of aerial vehicle 10 indicated by arrow 66 in the fixed wing flight configuration. Additionally or alternatively, blades 64 of first aft propeller 14 and second aft propeller 14' may be oriented at least substantially parallel to first aft elongated member 24 and second aft elongated member 24', respectively, in the fixed wing flight configuration. In some examples, blades 64 of first aft propeller 14 and second aft propeller 14' may be spring-loaded folding blades 64 that fold when aerial vehicle 10 is in the fixed wing flight configuration.

In some examples, spring-loaded folding blades 64 of first aft propeller 14 may be configured to fold to be at least substantially parallel with first aft landing arm 20, and spring-loaded folding blades 64 of second aft propeller 14' may be configured to fold to be at least substantially parallel with second aft landing arm 20' when aerial vehicle 10 is in the fixed wing flight configuration. Additionally or alternatively, spring-loaded folding blades 64 of first aft propeller 14 may be configured to fold to be at least substantially parallel with first aft elongated member 24 and spring-loaded folding blades 64 of second aft propeller 14' may be configured to fold to be at least substantially parallel with second aft elongated member 24' when aerial vehicle 10 is in the fixed wing flight configuration.

Figure 7:
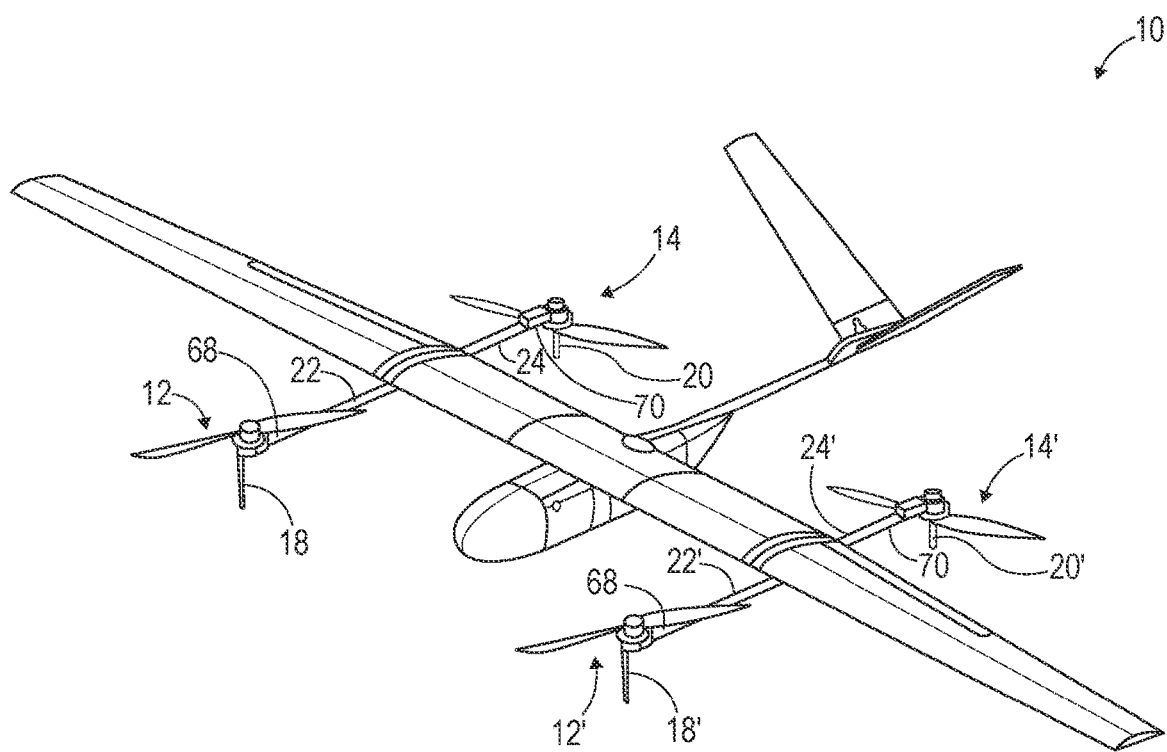
FIG. 7 is a perspective view of an example of an aerial vehicle according to the present disclosure in a vertical takeoff and landing configuration.
Figure 8:
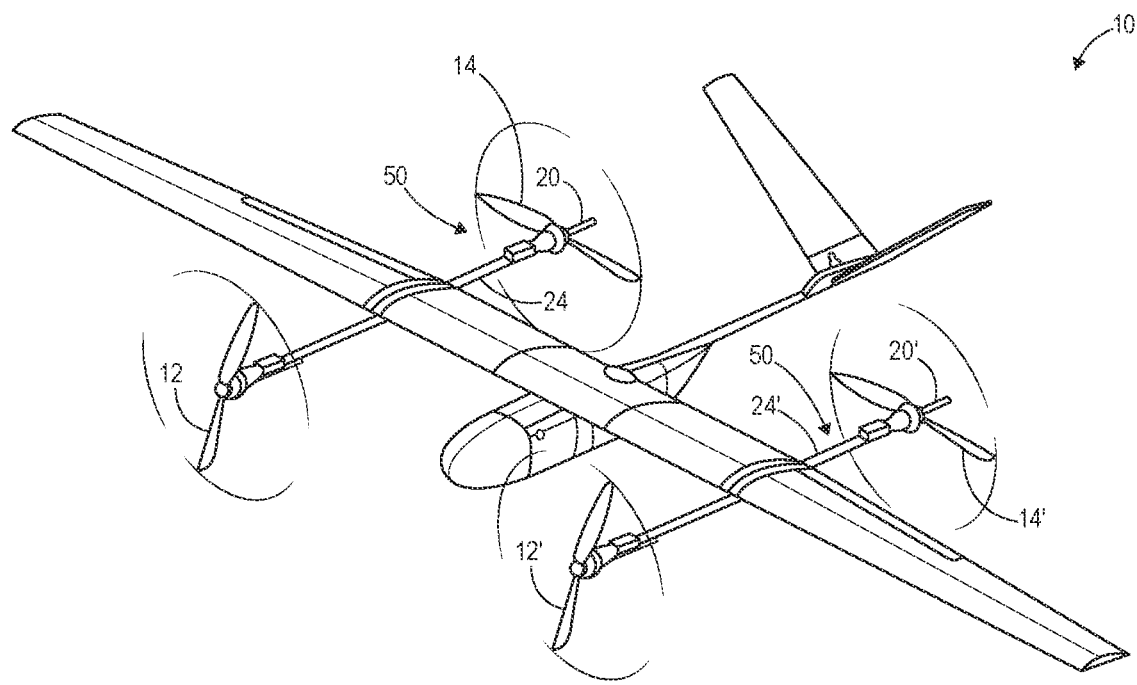
FIG. 8 is a perspective view of an example of an aerial vehicle according to the present disclosure in a fixed wing flight configuration.

FIGS. 7-8 illustrate another example of aerial vehicle 10. In this example, all the propellers (e.g., first forward propeller 12, second forward propeller 12', first aft propeller 14, and second aft propeller 14') spin, or rotate in both the VTOL configuration (FIG. 7) and the fixed wing flight configuration (FIG. 8). The propellers also maintain their spinning direction in both configurations. In this example, first and second forward propellers 12, 12' are coupled to an upper side 68 of first forward elongated member 22 and second forward elongated member 22', respectively, while first and second aft propellers 14, 14' are coupled to a lower side 70 of first aft elongated member 24 and second aft elongated member 24', respectively. First forward propeller 12 and second forward propeller 12' may be configured to be selectively tilted upwards with respect to aerial vehicle 10 to transition aerial vehicle 10 from the fixed wing flight configuration (FIG. 8) to the VTOL configuration (FIG. 7), whereas first aft propeller 14 and second aft propeller 14' may be configured to be selectively tilted downwards with respect to aerial vehicle 10, to transition aerial vehicle 10 from the fixed wing flight configuration (FIG. 8) to the VTOL configuration (FIG. 7).

In some examples, first aft landing arm 20 may be coupled to first aft propeller 14 such that first aft landing arm 20 spins with first aft propeller 14. Similarly, second aft landing arm 20' may be coupled to second aft propeller 14' such that second aft landing arm 20' spins with second aft propeller 14'. In these examples, aerial vehicle 10 may be configured to land on harder or solid landing surfaces, due to spinning of aft landing arms 20, 20' as aerial vehicle 10 lands. As shown in FIG. 8, aft landing arms 20, 20' may be aligned with general airflow (e.g., extending rearwardly from trailing edge region 50 of aft elongated members 24, 24') when aerial vehicle 10 is in the fixed wing flight configuration.

Figure 9:
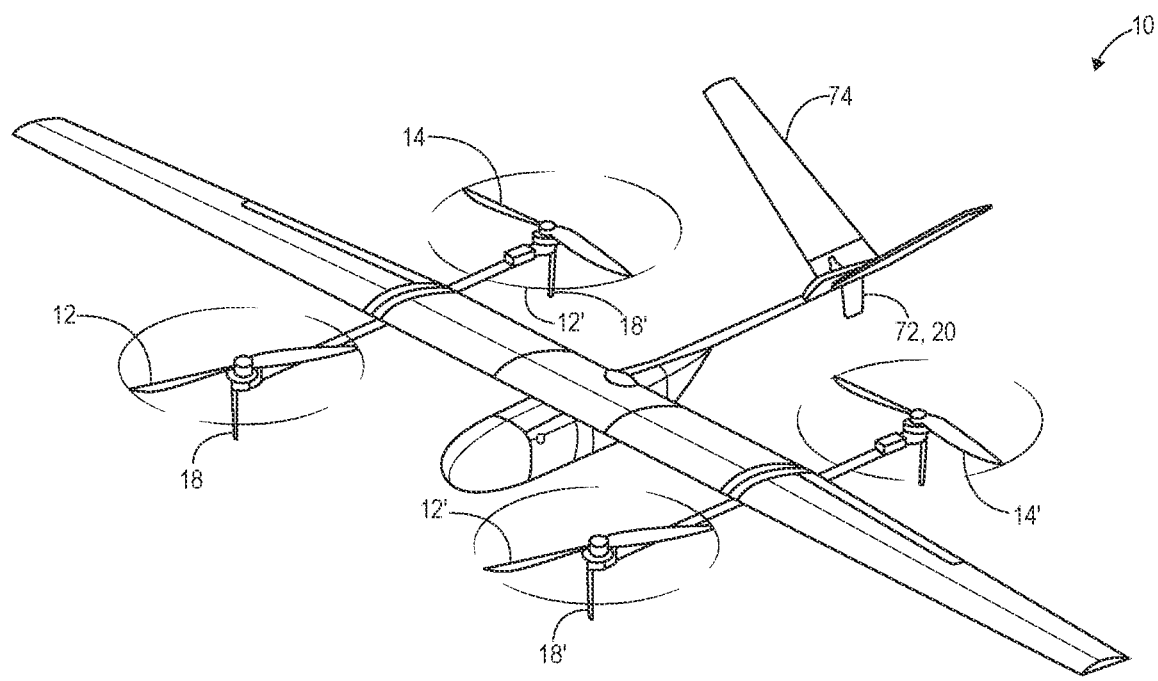
FIG. 9 is a perspective view of an example of an aerial vehicle according to the present disclosure in a vertical takeoff and landing configuration.
Figure 10:
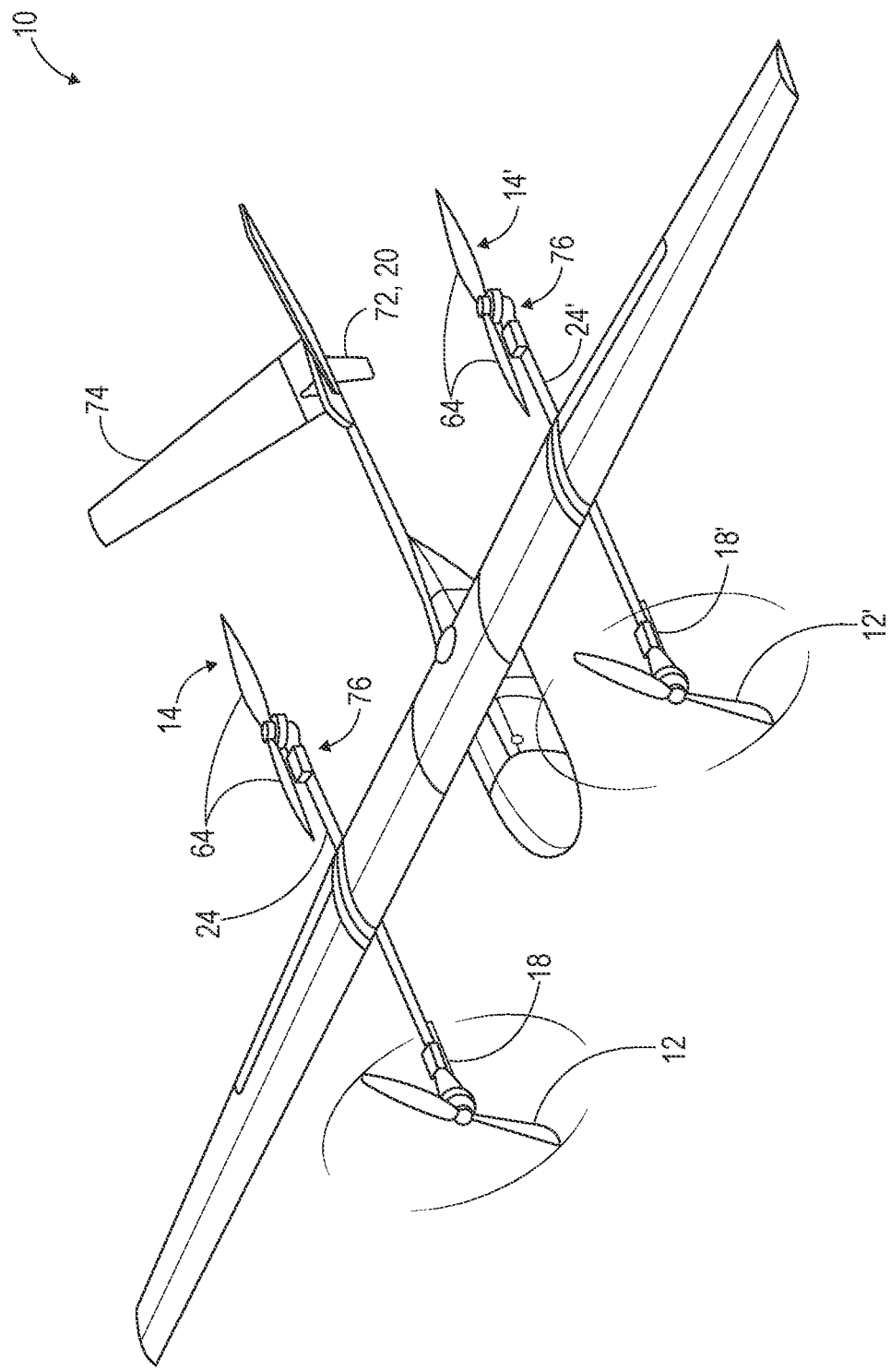
FIG. 10 is a perspective view of an example of an aerial vehicle according to the present disclosure in a fixed wing flight configuration, with an alignment mechanism associated with the aft propellers.

FIGS. 9-10 illustrate another example of aerial vehicle 10, in which first and second forward propellers 12, 12' and first and second aft propellers 14, 14' are all involved in VTOL flight (FIG. 9, which shows aerial vehicle 10 in the VTOL configuration), while only first and second forward propellers 12, 12' are involved in fixed wing flight (FIG. 10, which shows aerial vehicle 10 in the fixed wing flight configuration). In the example of FIGS. 9-10, aerial vehicle 10 includes first and second forward landing arms 18, 18' that are coupled to and tilt with first and second forward propellers 12, 12', respectively, to transition aerial vehicle 10 between configurations. Aft landing arm 20 in this example is in the form of an aft fin 72, which is generally stationary with respect to aerial vehicle 10 (e.g., aft fin 72 generally does not tilt to transition aerial vehicle 10 between configurations). Aft fin 72 may extend downwardly from a vertical stabilizer 74 of aerial vehicle 10, rather than being coupled to aft propellers 14, 14'. In some examples, aft fin 72 serves as a housing for one or more antennae or other components of aerial vehicle 10. As shown in FIG. 10, first aft propeller 14 and second aft propeller 14' may include an alignment system 76 configured to align blades 64 of first aft propeller 14 and second aft propeller 14' to minimize drag when aerial vehicle 10 is in the fixed wing flight configuration (FIG. 10). For example, as shown in FIG. 10, alignment system 76 may be configured to align blades 64 of first and second aft propellers 14, 14' to be substantially parallel to first and second aft elongated members 24, 24', respectively. In this manner, first and second aft propellers 14, 14' may be substantially stationary (e.g., do not rotate or spin) in the fixed wing flight configuration.

FIGS. 11-16 illustrate various examples and variations of landing arms and/or landing feet, which may serve as, or be included on, one or more forward landing arms 18 and/or one or more aft landing arms 20 in various examples of aerial vehicle 10. In some examples, aerial vehicle 10 includes the same type or style of landing arm and/or landing foot for each forward landing arm 18 and/or aft landing arm 20. In some examples, aerial vehicle 10 includes two or more different styles or types or sizes of landing arms and/or landing feet among forward landing arms 18 and/or aft landing arms 20. Any of the examples of landing arms and/or landing feet described in connection with FIGS. 11-16 (and variants thereof) may be used with any of the examples of aerial vehicle 10 described herein, alone or in combination with other styles of landing arms, such as the stick, post, leg, column, or bar landing arms 18, 20 in some examples, and/or landing arms 18, 20 that may spin, or rotate, with its associated propeller.

Figure 11:
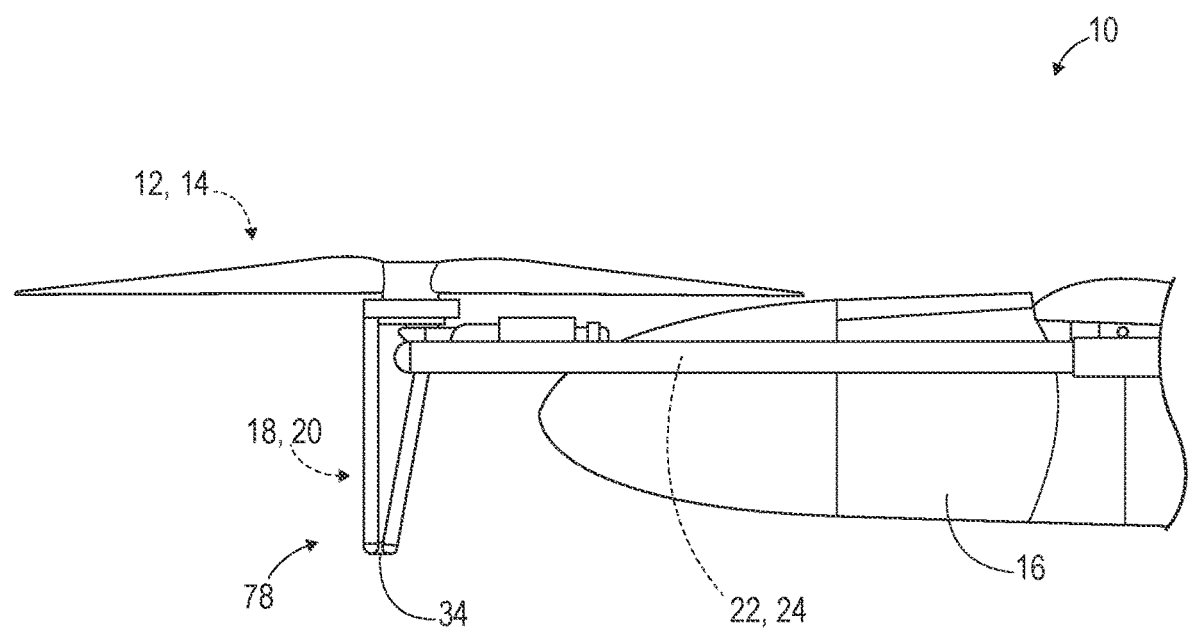
FIG. 11 is a side elevation view of an example of a landing arm according to the present disclosure, when the aerial vehicle is in the vertical takeoff and landing configuration.
Figure 12:
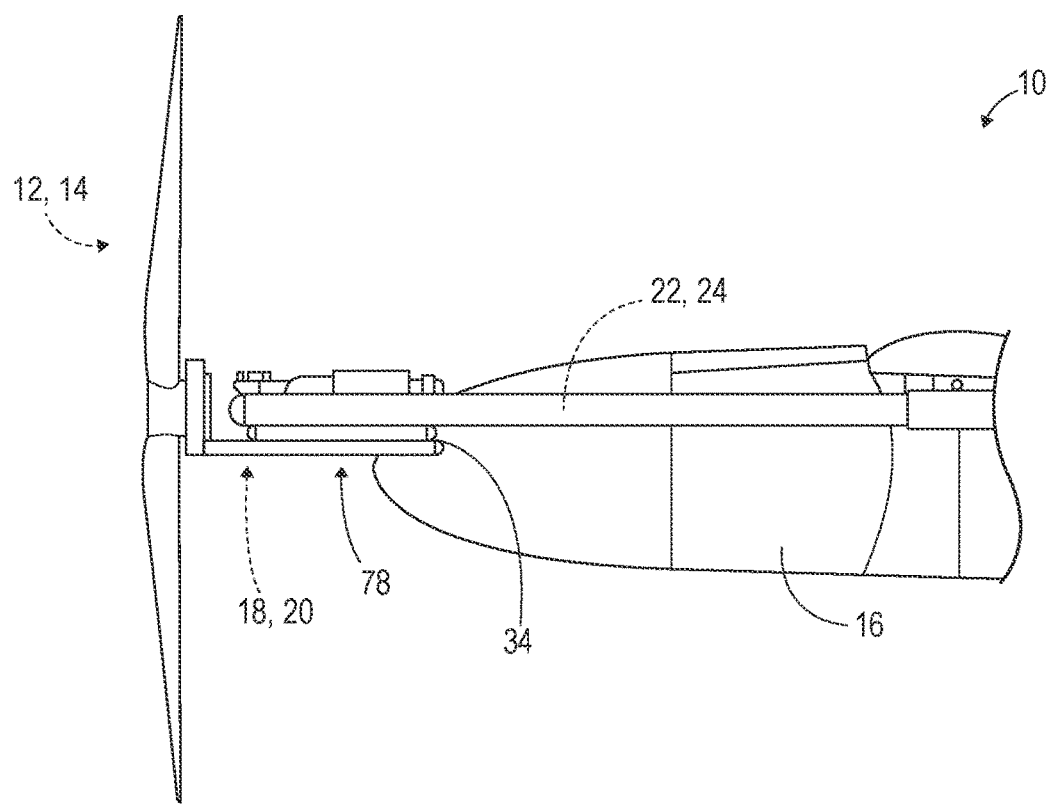
FIG. 12 is a side elevation view of an example of a landing arm according to the present disclosure, when the aerial vehicle is in the fixed wing flight configuration and the landing arm is in the stowed, or retracted position.

FIGS. 11-12 illustrate an example of forward landing arm 18 and/or aft landing arm 20 in the form of a four-bar linkage 78. FIG. 11 illustrates aerial vehicle 10 in the VTOL configuration, with the propeller (which may be forward propeller 12 and/or aft propeller 14) oriented such that it rotates in a substantially horizontal plane, which generally may be substantially parallel to the landing surface on which aerial vehicle 10 is configured to land. Four-bar linkage 78 extends downward towards the landing surface in the VTOL configuration of FIG. 11. FIG. 12 shows aerial vehicle 10 in the fixed wing flight configuration, in which the propeller 12, 14 has been tilted to rotate in a different plane than when aerial vehicle 10 is in the VTOL configuration. In this example, propeller 12, 14 rotates in a substantially vertical plane in the fixed wing flight configuration. Because of the coupling between propeller 12, 14 and four-bar linkage 78, four-bar linkage 78 also is tilted when propeller 12, 14 is tilted to change the flight mode configuration of aerial vehicle 10. Thus, four-bar linkage 78 is shown in a retracted, or stowed position in FIG. 12 when aerial vehicle 10 is in the fixed wing flight configuration, with four-bar linkage 78 being folded and compressed against forward or aft elongated member 22, 24. Four-bar linkage 78 may be configured to distribute compression loads to one or more additional points on elongated member 22, 24, thereby relieving or reducing loads on propeller 12, 14. Bars of four-bar linkage 78 may be configured to release buckling under compression, while still remaining relatively slim, or slender, in form.

Figure 13:
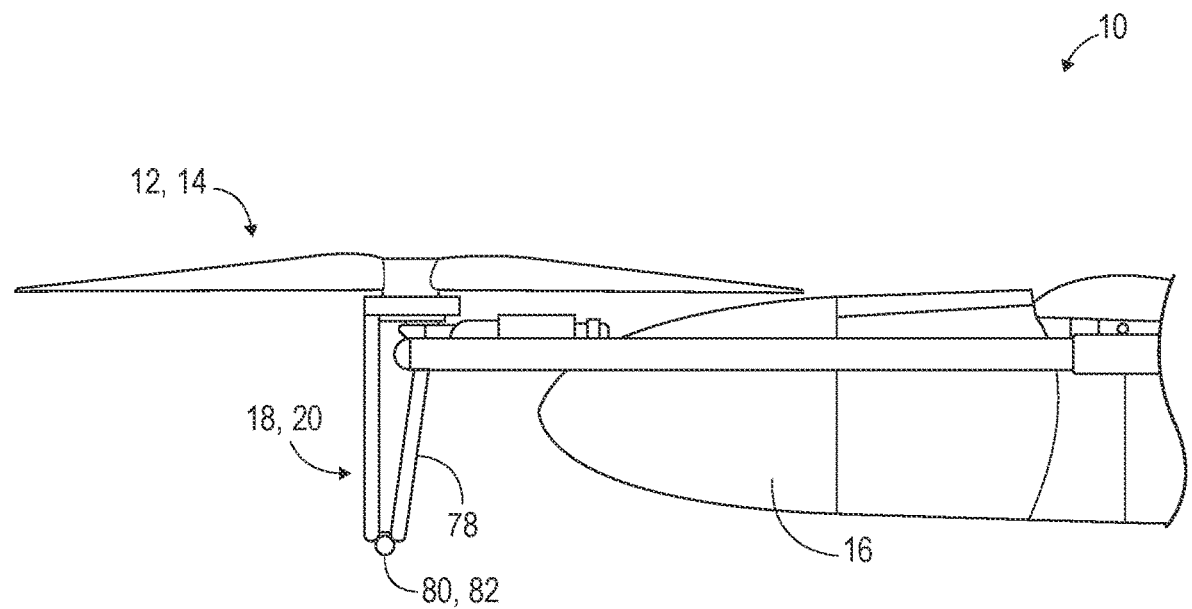
FIG. 13 is a side elevation view of another example of a landing arm having a landing foot according to the present disclosure, with the aerial vehicle in the vertical takeoff and landing configuration.
Figure 14:
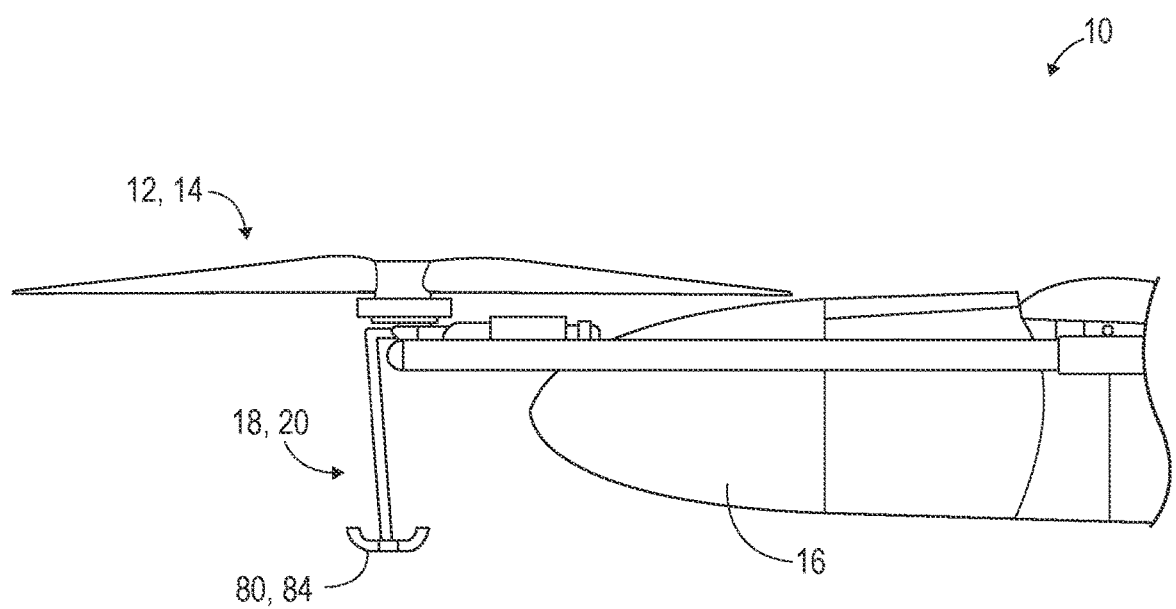
FIG. 14 is a side elevation view of another example of a landing arm having a landing foot according to the present disclosure, with the aerial vehicle in the vertical takeoff and landing configuration.
Figure 15:
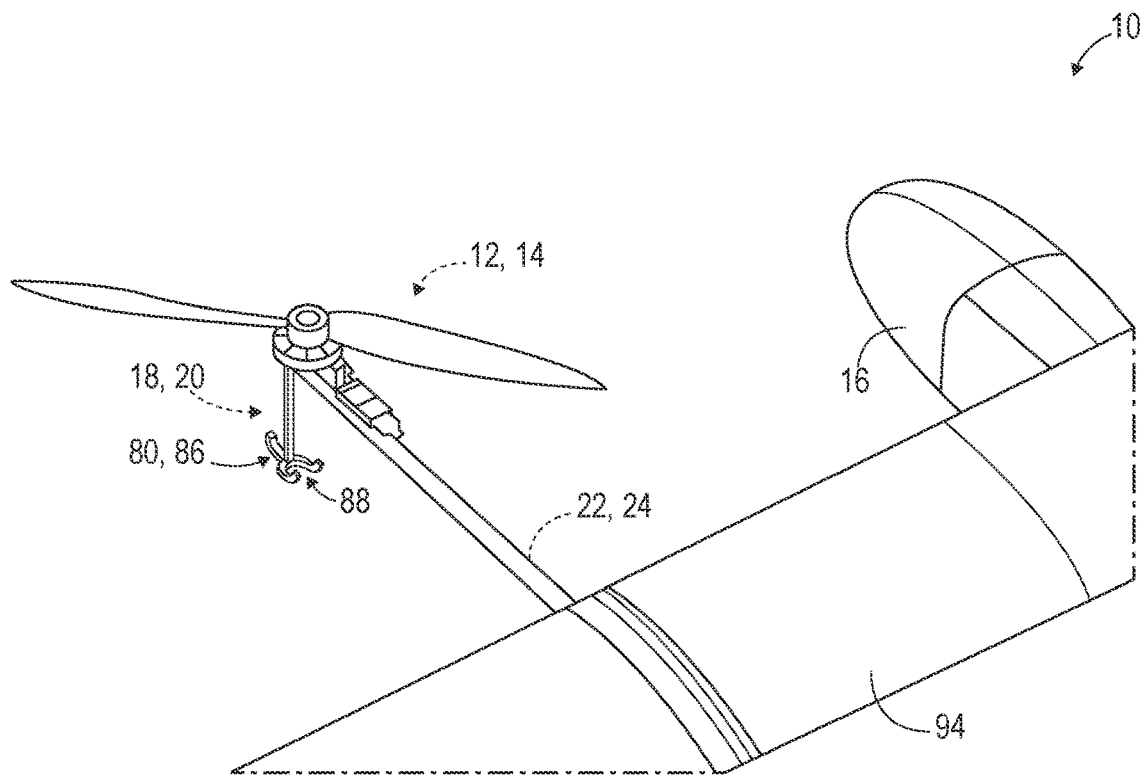
FIG. 15 is a perspective view of another example of a landing arm having a landing foot according to the present disclosure, with the aerial vehicle in the vertical takeoff and landing configuration.
Figure 16:
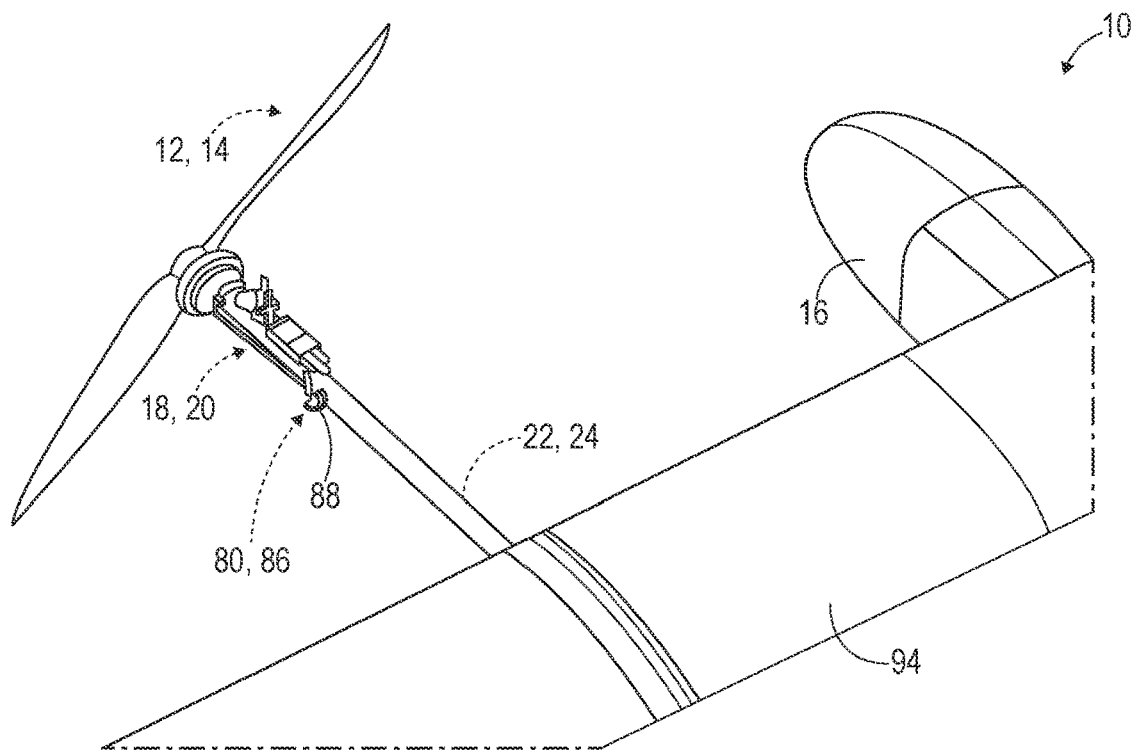
FIG. 16 is a perspective view of the landing arm of FIG. 15, with the aerial vehicle in the fixed wing flight configuration.

FIGS. 13-16 illustrate examples of landing arms (e.g., forward landing arm 18 and/or aft landing arm 20) that include a landing foot 80, which is configured to engage the landing surface when aerial vehicle 10 is in the VTOL configuration and lands on the landing surface. FIGS. 13-15 illustrate examples of aerial vehicle 10 in the VTOL configuration, with the landing arms 18, 20 and landing feet 80 extending downwardly towards the landing surface, while FIG. 16 illustrates aerial vehicle 10 in the fixed wing flight configuration, with landing arm 18, 20 in the stowed position. In the example of FIG. 13, landing arm 18, 20 includes four-bar linkage 78 and landing foot 80 in the form of a wheel 82. For example, wheel 82 may be coupled to the member of four-bar linkage 78 that is closest to the landing surface when aerial vehicle 10 lands on the landing surface. Such wheels 82 may be included with other examples of landing arms 18, 20 as well. In the example of FIG. 14, landing arm 18, 20 takes the form of a simple post, and landing foot 80 is shown in the form of a skid 84. In the example of FIGS. 15-16, landing foot 80 is shown in the form of a talon 86. Additionally or alternatively, landing feet 80 may include a column end, a mid-member of a bar linkage mechanism, a grip, a cap, a cushioning structure, an inflatable device, and/or a ball bearing. Landing feet 80 may be configured to provide compliance on different or variable terrain used as landing surfaces, and/or may be configured to provide stability to aerial vehicle 10 while it is on a landing surface.

In some examples, one or more landing feet 80 may be configured to engage a respective elongated member 22, 24 when aerial vehicle 10 is in the fixed wing flight configuration. For example, landing feet 80 may be configured to partially surround, latch onto, snap onto, and/or be pressed against elongated member 22, 24 when the respective landing arm is tilted into the stowed position. In a specific example, landing foot 80 may include a cut-out 88 that is shaped and sized to accommodate a respective elongated member 22, 24. In this manner, cut-out 88 may be positioned such that it partially surrounds ("hugs") a respective elongated member 22, 24 when the landing arm is tilted to the stowed position (which is substantially parallel to elongated member 22, 24, in this example), as shown in FIG. 16.

Figure 17:
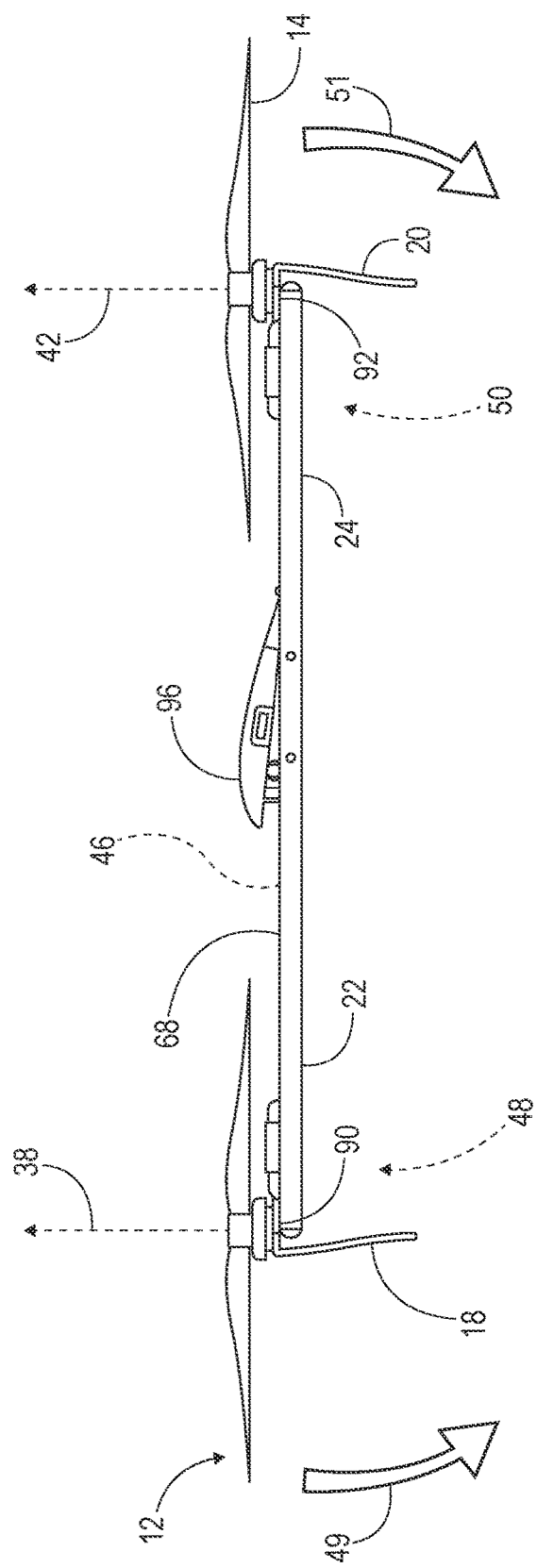
FIG. 17 is a side elevation view of propellers and landing arms of a representative example of presently disclosed aerial vehicles.
Figure 18:
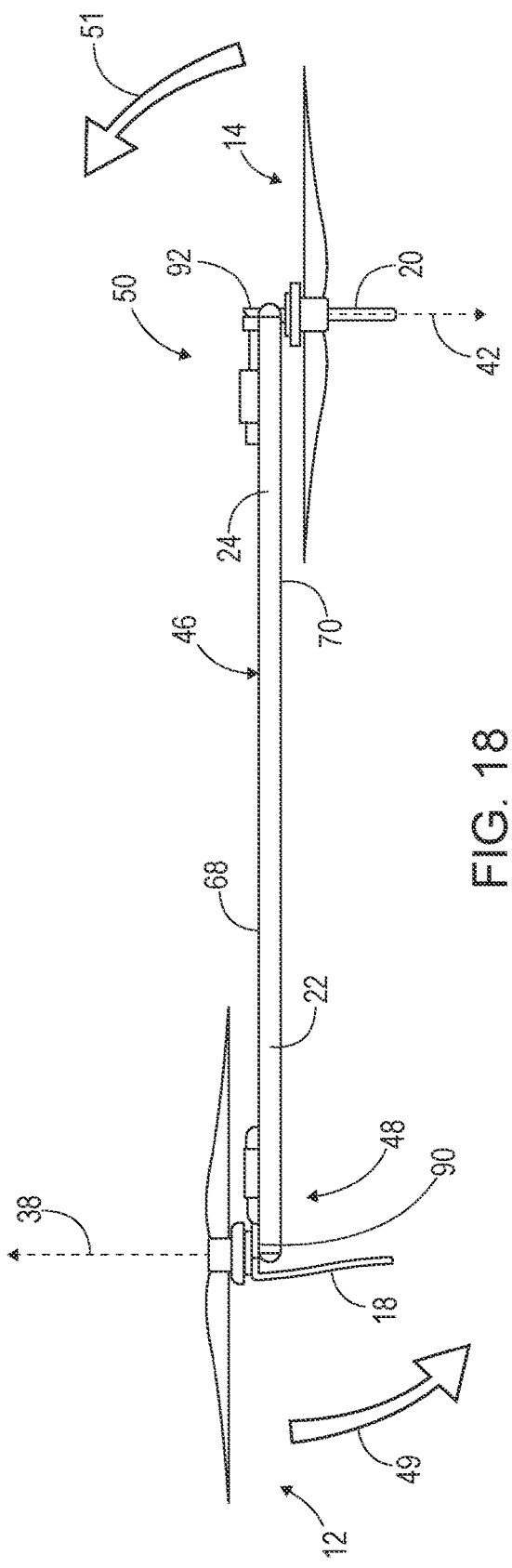
FIG. 18 is a side elevation view of propellers and landing arms of a representative example of presently disclosed aerial vehicles.

FIGS. 17-18 illustrate examples of components of disclosed aerial vehicles 10, showing possible arrangements of propellers 12, 14 with respect to elongated members 22, 24. In FIG. 17, forward propeller 12 and aft propeller 14 are shown coupled to upper side 68 of respective elongated members 22, 24 (shown here integrally formed together as lift boom 46) in the VTOL configuration. A structure 96 may be used to couple lift boom 46 to wing 94 of aerial vehicle 10. Longitudinal axis 38 of forward landing arm 18 is shown as substantially perpendicular to forward elongated member 22, and longitudinal axis 42 of aft landing arm 20 is shown as substantially perpendicular to aft elongated member 24, in this configuration. Landing arms 18, 20 may be a simple stick, or bar, as shown in FIG. 17. To transition the aerial vehicle to the fixed wing flight configuration, forward propeller 12 and aft propeller 14 will be tilted downward (e.g., in the directions indicated by arrows 49, 51 respectively). In the fixed wing flight configuration for this example, forward landing arm 18 will be tilted along with forward propeller 12 such that forward landing arm 18 is positioned in its stowed position, adjacent and/or against leading edge region 48 of lift boom 46 (e.g., forward elongated member 22). Similarly, aft landing arm 20 will be tilted with aft propeller 14 in the fixed wing flight configuration such that aft landing arm 20 is positioned in its stowed position, adjacent and/or against trailing edge region 50 of lift boom 46 (e.g., aft elongated member 24). Forward propeller 12 and forward landing arm 18 may be tilted with respect to lift boom 46, such as by forward revolution joint 90, and aft propeller 14 and aft landing arm 20 may be tilted with respect to lift boom 46, such as by aft revolution joint 92, though any suitable mechanism for tilting propellers 12, 14 and landing arms 18, 20 is within the scope of the present disclosure.

FIG. 18 illustrates another example of components for aerial vehicle 10, in which forward propeller 12 is coupled to upper side 68 of lift boom 46 (e.g., upper side 68 of forward elongated member 22), and aft propeller 14 is coupled to lower side 70 of lift boom 46 (e.g., lower side 70 of aft elongated member 24) in the illustrated VTOL configuration. Both forward landing arm 18 and aft landing arm 20 extend downwardly in this configuration, as shown. As with the example of FIG. 17, longitudinal axis 38 of forward landing arm 18 is shown as substantially perpendicular to forward elongated member 22, and longitudinal axis 42 of aft landing arm 20 is shown as substantially perpendicular to aft elongated member 24, in this configuration. As shown in the example of FIG. 18, different types of landing arms may be included in a given aerial vehicle 10, such as the simple stick or bar used as forward landing arm 18 and the rotating landing arm used as aft landing arm 20, which is configured to rotate with aft propeller 14.

To transition the aerial vehicle to the fixed wing flight configuration, forward propeller 12 will be tilted downward (e.g., in the direction indicated by arrow 49), and aft propeller 14 will be tilted upward (e.g., in the direction indicated by arrow 51). In the fixed wing flight configuration for this example, forward landing arm 18 will be tilted along with forward propeller 12 such that forward landing arm 18 is positioned in its stowed position, adjacent and/or against leading edge region 48 of lift boom 46 (e.g., forward elongated member 22). On the other hand, aft landing arm 20 will be tilted with aft propeller 14 in the fixed wing flight configuration such that aft landing arm 20 is positioned in its stowed position, extending past trailing edge region 50 of lift boom 46 (e.g., aft elongated member 24). Forward propeller 12 and forward landing arm 18 may be tilted with respect to lift boom 46, such as by forward revolution joint 90, and aft propeller 14 and aft landing arm 20 may be tilted with respect to lift boom 46, such as by aft revolution joint 92, though any suitable mechanism for tilting propellers 12, 14 and landing arms 18, 20 is within the scope of the present disclosure.

Figure 19:
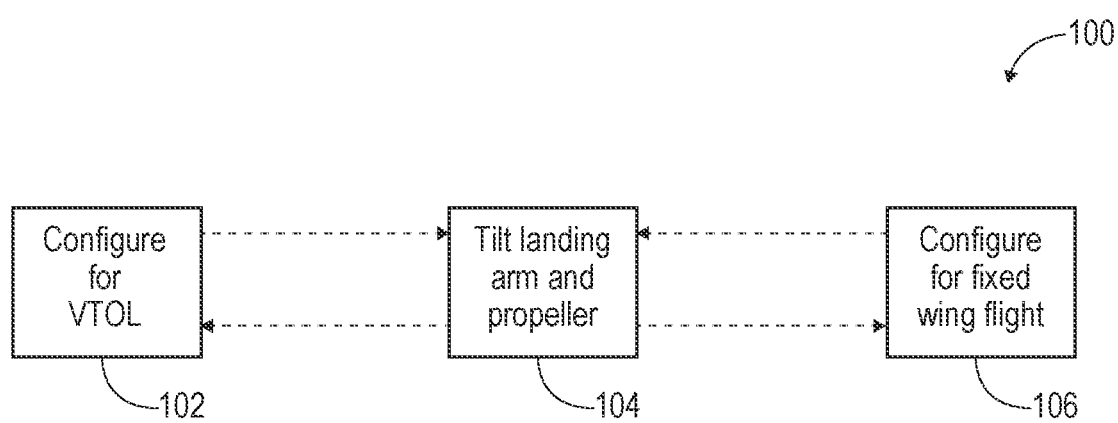
FIG. 19 is a schematic flowchart diagram of methods according to the present disclosure.

FIG. 19 schematically provides a flowchart that represents illustrative, non-exclusive examples of methods 100 according to the present disclosure. In FIG. 19, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 19 are not limiting and other methods and steps are within the scope of the present disclosure, including methods having greater than or fewer than the number of steps illustrated, as understood from the discussions herein.

Methods 100 generally include configuring an aerial vehicle (e.g., aerial vehicle 10) for vertical takeoff or landing (VTOL) at 102, wherein the configuring comprises positioning at least one landing arm (e.g., one or more forward landing arms 18 and/or one or more aft landing arms 20) such that it extends downwardly from the aerial vehicle, and tilting the at least one landing arm together with at least one respective propeller (e.g., one or more forward propellers 12 and/or one or more aft propellers 14) at 104, to configure the aerial vehicle for fixed wing flight (e.g., putting the aerial vehicle in a fixed wing flight configuration). In some examples of method 100, the aerial vehicle is configured such that each respective landing arm of the at least one landing arm is coupled to a respective propeller of the at least one propeller. When the aerial vehicle is in the VTOL configuration, tilting the landing arm(s) and propeller(s) can be performed at 104 to transition the aerial vehicle to the fixed wing flight configuration. After tilting the landing arm(s) and propeller(s) at 104 (thereby putting the aerial vehicle in the fixed wing flight configuration), the tilting the landing arm(s) and propeller(s) may again be performed at 104 by tilting the landing arm(s) and propeller(s) in the opposite direction, thereby again configuring the aerial vehicle for vertical takeoff or landing at 102. For example, if the aerial vehicle is configured such that the landing arm(s) and propeller(s) are tilted downward at 104 to transition the aerial vehicle to the fixed wing flight configuration, then the landing arm(s) and propeller(s) may be later tilted upward at 104 to transition the aerial vehicle back to the VTOL configuration, thereby positioning the landing arm(s) and propeller(s) back in their previous respective positions with respect to the aerial vehicle.

Thus, if the aerial vehicle is in the fixed wing flight configuration, tilting the landing arm(s) and propeller(s) can be performed at 104 to transition the aerial vehicle to the VTOL configuration. Put another way, methods 100 may include configuring the aerial vehicle for fixed wing flight at 106 and tilting the landing arm(s) and propeller(s) at 104 to transition the aerial vehicle to the VTOL configuration. Such transitions (e.g., tilting back and forth between the VTOL configuration and the fixed wing flight configuration) can be performed at 104 as many times as desired, or as needed during a given mission or flight of the aerial vehicle. Thus, it may be said that the disclosed aerial vehicles are configured to be selectively transitioned back and forth between the two different flight modes.

Tilting the propeller(s) and landing arm(s) at 104 may include tilting the propeller(s) and landing arm(s) by at least about 90 degrees with respect to the aerial vehicle. In other methods, the propeller(s) and landing arm(s) may be tilted at 104 by less than 90 degrees. In some examples, tilting the landing arm(s) and propeller(s) at 104 may be determined by a mechanism actuated by an electromagnetic motor, a hydraulic actuation system, and/or a pneumatic actuation system.

Illustrative, non-exclusive examples of inventive subject matter according to the present disclosure are described in the following enumerated paragraphs:

A1. An aerial vehicle (10) configured to be selectively transitioned between a fixed wing flight configuration and a vertical takeoff and landing (VTOL) configuration, the aerial vehicle (10) comprising:

a forward propeller (12) configured to rotate when the aerial vehicle (10) is in the fixed wing flight configuration and when the aerial vehicle (10) is in the VTOL configuration, wherein in the fixed wing flight configuration the forward propeller (12) rotates in a first forward plane (26), wherein in the VTOL configuration the forward propeller (12) is tilted such that the forward propeller (12) rotates in a second forward plane (28), and wherein the first forward plane (26) is arranged at a first non-parallel angle with respect to the second forward plane (28);

an aft propeller (14) configured to rotate at least when the aerial vehicle (10) is in the VTOL configuration;

a forward landing arm (18), wherein the forward landing arm (18) is configured to be tilted to a stowed position when the aerial vehicle (10) is in the fixed wing flight configuration, and wherein the forward landing arm (18) is coupled to the forward propeller (12) such that tilting (104) of the forward propeller (12) causes corresponding tilting (104) of the forward landing arm (18); and an aft landing arm (20), wherein the forward landing arm (18) and the aft landing arm (20) are configured to extend downwardly when the aerial vehicle (10) is in the VTOL configuration, such that the forward landing arm (18) and the aft landing arm (20) at least partially support the aerial vehicle (10) when the aerial vehicle (10) is in the VTOL configuration and lands on a landing surface.

A1.1. The aerial vehicle (10) of paragraph A1, wherein the aft propeller (14) is configured to rotate when the aerial vehicle (10) is in the fixed wing flight configuration.

A1.2. The aerial vehicle (10) of paragraph A1.1, wherein the aft propeller (14) rotates in a first aft plane (30) when the aerial vehicle (10) is in the fixed wing flight configuration, wherein the aft propeller (14) is tilted when the aerial vehicle (10) is in the VTOL configuration such that the aft propeller (14) rotates in a second aft plane (32), and wherein the first aft plane (30) is arranged at a second non-parallel angle with respect to the second aft plane (32).

A1.3. The aerial vehicle (10) of any of paragraphs A1-A1.2, wherein the aft landing arm (20) is coupled to the aft propeller (14) such that tilting (104) of the aft propeller (14) causes corresponding tilting (104) of the aft landing arm (20).

A1.4. The aerial vehicle (10) of any of paragraphs A1-A1.3, wherein the aerial vehicle (10) is configured such that the forward landing arm (18) and/or the aft landing arm (20) produce less drag when the aerial vehicle (10) is in the fixed wing flight configuration than when the aerial vehicle (10) is in the VTOL configuration.

A1.5. The aerial vehicle (10) of any of paragraphs A1-A1.4, further comprising a forward elongated member (22), wherein the forward propeller (12) is coupled to the forward elongated member (22).

A1.6. The aerial vehicle (10) of any of paragraphs A1-A1.5, further comprising an aft elongated member (24), wherein the aft propeller (14) is coupled to the aft elongated member (24).

A1.7. The aerial vehicle (10) of any of paragraphs A1-A1.6, wherein the aft landing arm (20) is configured to be tilted to a stowed position when the aerial vehicle (10) is in the fixed wing flight configuration.

A2. The aerial vehicle (10) of any of paragraphs A1-A1.7, wherein the first forward plane (26) is at least substantially perpendicular to the second forward plane (28).

A2.1. The aerial vehicle (10) of any of paragraphs A1-A2, wherein a/the first aft plane (30) is at least substantially perpendicular to a/the second aft plane (32).

A3. The aerial vehicle (10) of any of paragraphs A1-A2.1, wherein the first non-parallel angle and a/the second non-parallel angle are at least substantially equal.

A4. The aerial vehicle (10) of any of paragraphs A1-A3, wherein in the VTOL configuration, a lower end (34) of each of the forward landing arm (18) and the aft landing arm (20) is oriented facing a/the landing surface on which the aerial vehicle (10) is configured to land.

A5. The aerial vehicle (10) of any of paragraphs A1-A4, wherein in the VTOL configuration, each of the forward landing arm (18) and the aft landing arm (20) extends downwards towards a/the landing surface on which the aerial vehicle (10) is configured to land.

A6. The aerial vehicle (10) of any of paragraphs A1-A5, wherein in the fixed wing flight configuration, a/the lower end (34) of each of the forward landing arm (18) and the aft landing arm (20) is angled away from a/the landing surface on which the aerial vehicle (10) is configured to land.

A7. The aerial vehicle (10) of any of paragraphs A1-A6, wherein in the fixed wing flight configuration, a/the lower end (34) of each of the forward landing arm (18) and the aft landing arm (20) is angled away from a vertical axis (36) along which the aerial vehicle (10) is configured to move in the VTOL configuration.

A8. The aerial vehicle (10) of any of paragraphs A1-A7, wherein a longitudinal axis (38) of the forward landing arm (18) is at least substantially perpendicular to a longitudinal axis (40) of a/the forward elongated member (22), when the aerial vehicle (10) is in the VTOL configuration.

A9. The aerial vehicle (10) of any of paragraphs A1-A8, wherein a longitudinal axis (42) of the aft landing arm (20) is at least substantially perpendicular to a longitudinal axis (44) of a/the aft elongated member (24), when the aerial vehicle (10) is in the VTOL configuration.

A10. The aerial vehicle (10) of any of paragraphs A1-A9, wherein a/the longitudinal axis (38) of the forward landing arm (18) is at least substantially parallel to a/the longitudinal axis (40) of a/the forward elongated member (22) when the aerial vehicle (10) is in the fixed wing flight configuration.

A11. The aerial vehicle (10) of any of paragraphs A1-A10, wherein the forward landing arm (18) is engaged with and/or secured against a/the forward elongated member (22) when the aerial vehicle (10) is in the fixed wing flight configuration.

A12. The aerial vehicle (10) of any of paragraphs A1-A11, wherein a/the longitudinal axis (42) of the aft landing arm (20) is at least substantially parallel to a/the longitudinal axis (44) of a/the aft elongated member (24) when the aerial vehicle (10) is in the fixed wing flight configuration.

A13. The aerial vehicle (10) of any of paragraphs A1-A12, wherein the aft landing arm (20) is engaged with and/or secured against a/the aft elongated member (24) when the aerial vehicle (10) is in the fixed wing flight configuration.

A14. The aerial vehicle (10) of any of paragraphs A1-A13, wherein the first forward plane (26) is at least substantially parallel to a/the first aft plane (30).

A15. The aerial vehicle (10) of any of paragraphs A1-A14, wherein the first forward plane (26) and a/the first aft plane (30) are in the same plane.

A16. The aerial vehicle (10) of any of paragraphs A1-A15, wherein a/the forward elongated member (22) is integrally formed with a/the aft elongated member (24) such that the aerial vehicle (10) comprises a lift boom (46) that forms the forward elongated member (22) and the aft elongated member (24).

A17. The aerial vehicle (10) of paragraph A16, wherein the lift boom (46) extends from a leading edge region (48) to a trailing edge region (50), wherein the forward propeller (12) is coupled within the leading edge region (48) of the lift boom (46), and wherein the aft propeller (14) is coupled within the trailing edge region (50) of the lift boom (46).

A18. The aerial vehicle (10) of any of paragraphs A1-A17, wherein a/the forward elongated member (22) is at least substantially parallel to a/the aft elongated member (24).

A19. The aerial vehicle (10) of any of paragraphs A1-A18, wherein a/the forward elongated member (22) is coupled to and/or fixed with respect to a/the aft elongated member (24).

A20. The aerial vehicle (10) of any of paragraphs A1-A19, wherein a/the forward elongated member (22) and a/the aft elongated member (24) are coupled to a wing (94) of the aerial vehicle (10), wherein the wing (94) is configured to provide lift to the aerial vehicle (10) when the aerial vehicle (10) is in the fixed wing flight configuration.

A21. The aerial vehicle (10) of any of paragraphs A1-A20, wherein the forward landing arm (18) is at least substantially fixed with respect to the forward propeller (12).

A22. The aerial vehicle (10) of any of paragraphs A1-A21, wherein the aft landing arm (20) is at least substantially fixed with respect to the aft propeller (14).

A23. The aerial vehicle (10) of any of paragraphs A1-A22, wherein the forward propeller (12) comprises a first forward propeller (12), wherein the aft propeller (14) comprises a first aft propeller (14), and wherein the aerial vehicle (10) further comprises a second forward propeller (12') and a second aft propeller (14').

A23.1. The aerial vehicle (10) of paragraph A23, wherein the forward landing arm (18) comprises a first forward landing arm (18), and wherein the aerial vehicle (10) further comprises a second forward landing arm (18').

A23.2. The aerial vehicle (10) of paragraph A23 or A23.1, wherein the aft landing arm (20) comprises a first aft landing arm (20), and wherein the aerial vehicle (10) further comprises a second aft landing arm (20').

A23.3. The aerial vehicle (10) of paragraph A23.1 or A23.2, wherein the first forward landing arm (18) is coupled to the first forward propeller (12), and wherein the second forward landing arm (18') is coupled to the second forward propeller (12').

A23.4. The aerial vehicle (10) of any of paragraphs A23-A23.3, wherein a/the first aft landing arm (20) is coupled to the first aft propeller (14), and wherein a/the second aft landing arm (20') is coupled to the second aft propeller (14').

A23.5. The aerial vehicle (10) of any of paragraphs A23-A23.4, wherein the aerial vehicle (10) comprises:
- a first forward elongated member (22), wherein the first forward propeller (12) is coupled to the first forward elongated member (22);
- a second forward elongated member (22'), wherein the second forward propeller (12') is coupled to the second forward elongated member (22');
- a first aft elongated member (24), wherein the first aft propeller (14) is coupled to the first aft elongated member (24); and
- a second aft elongated member (24'), wherein the second aft propeller (14') is coupled to the second aft elongated member (24').

A23.6 The aerial vehicle (10) of paragraph A23.5, wherein the first forward elongated member (22) is integrally formed with the first aft elongated member (24), and wherein the second forward elongated member (22') is integrally formed with the second aft elongated member (24').

A24. The aerial vehicle (10) of any of paragraphs A23-A23.6, wherein the first forward propeller (12), the second forward propeller (12'), the first aft propeller (14), and the second aft propeller (14') are all configured to spin when the aerial vehicle (10) is in the VTOL configuration.

A24.1. The aerial vehicle (10) of any of paragraphs A23-A24, wherein the first forward propeller (12), the second forward propeller (12'), the first aft propeller (14), and the second aft propeller (14') are all configured to spin when the aerial vehicle (10) is in the fixed wing flight configuration.

A25. The aerial vehicle (10) of any of paragraphs A23-A24.1, wherein the first aft propeller (14) and the second aft propeller (14') are configured to spin in a respective reverse direction in the VTOL configuration than in the fixed wing flight configuration.

A26. The aerial vehicle (10) of any of paragraphs A23-A24, wherein the first forward propeller (12) and the second forward propeller (12') are configured to maintain their respective spinning directions in both the VTOL configuration and the fixed wing flight configuration.

A27. The aerial vehicle (10) of any of paragraphs A23-A23.6, wherein the first forward propeller (12), the second forward propeller (12'), the first aft propeller (14), and the second aft propeller (14') are all configured to spin when the aerial vehicle (10) is in the VTOL configuration, and wherein only the first forward propeller (12) and the second forward propeller (12') are configured to spin in the fixed wing flight configuration.

A27.1. The aerial vehicle (10) of paragraph A27, wherein when the aerial vehicle (10) is in the fixed wing flight configuration, the first aft propeller (14) and the second aft propeller (14') are substantially stationary such that blades (64) of the first aft propeller (14) and blades (64) of the second aft propeller (14') are oriented at least substantially parallel to an air direction of the aerial vehicle (10).

A27.2. The aerial vehicle (10) of paragraph A27 or A27.1, wherein when the aerial vehicle (10) is in the fixed wing flight configuration, the first aft propeller (14) and the second aft propeller (14') are substantially stationary such that blades (64) of the first aft propeller (14) and blades (64) of the second aft propeller (14') are oriented at least substantially parallel to a/the first aft elongated member (24) and a/the second aft elongated member (24'), respectively.

A27.3. The aerial vehicle (10) of any of paragraphs A23-A27.2, wherein the first aft propeller (14) and the second aft propeller (14') comprise an alignment system (76) configured to align blades (64) of the first aft propeller (14) and the second aft propeller (14') to minimize drag when the aerial vehicle (10) is in the fixed wing flight configuration.

A28. The aerial vehicle (10) of any of paragraphs A23-A27.3, wherein the first aft propeller (14) and the second aft propeller (14') comprise spring-loaded folding blades (64) that fold when the aerial vehicle (10) is in the fixed wing flight configuration.

A29. The aerial vehicle (10) of paragraph A28, wherein the spring-loaded folding blades (64) of the first aft propeller (14) are configured to fold to be at least substantially parallel with a/the first aft landing arm (20) when the aerial vehicle (10) is in the fixed wing flight configuration, and wherein the spring-loaded blades (64) of the second aft propeller (14') are configured to fold to be at least substantially parallel with a/the second aft landing arm (20') when the aerial vehicle (10) is in the fixed wing flight configuration.

A30. The aerial vehicle (10) of paragraph A28 or A29, wherein the spring-loaded folding blades (64) of the first aft propeller (14) are configured to fold to be at least substantially parallel with a/the first aft elongated member (24) when the aerial vehicle (10) is in the fixed wing flight configuration, and wherein the spring-loaded folding blades (64) of the second aft propeller (14') are configured to fold to be at least substantially parallel with a/the second aft elongated member (24') when the aerial vehicle (10) is in the fixed wing flight configuration.

A31. The aerial vehicle (10) of any of paragraphs A23-A30, wherein the first forward propeller (12) is coupled to an upper side (68) of a/the first forward elongated member (22), wherein the second forward propeller (12') is coupled to an upper side (68) of a/the second forward elongated member (22'), wherein the first aft propeller (14) is coupled to a lower side (70) of a/the first aft elongated member (24), and wherein the second aft propeller (14') is coupled to a lower side (70) of a/the second aft elongated member (24').

A32. The aerial vehicle (10) of any of paragraphs A23-A31, wherein the first forward propeller (12) and the second forward propeller (12') are configured to be selectively tilted upwards with respect to the aerial vehicle (10), to transition the aerial vehicle (10) from the fixed wing flight configuration to the VTOL configuration.

A33. The aerial vehicle (10) of any of paragraphs A23-A32, wherein the first aft propeller (14) and the second aft propeller (14') are configured to be selectively tilted downwards with respect to the aerial vehicle (10), to transition the aerial vehicle (10) from the fixed wing flight configuration to the VTOL configuration.

A34. The aerial vehicle (10) of any of paragraphs A23-A33, wherein the first aft landing arm (20) is coupled to the first aft propeller (14) such that the first aft landing arm (20) spins with the first aft propeller (14), and wherein the second aft landing arm (20') is coupled to the second aft propeller (14') such that the second aft landing arm (20') spins with the second aft propeller (14').

A35. The aerial vehicle (10) of any of paragraphs A23-A34, wherein the first aft propeller (14) and the second aft propeller (14') are configured to maintain their respective spinning directions in both the VTOL configuration and the fixed wing flight configuration.

A36. The aerial vehicle (10) of any of paragraphs A23-A35, wherein the aft landing arm (20) comprises an aft fin (72) extending downwardly from a vertical stabilizer of the aerial vehicle (10).

A37. The aerial vehicle (10) of paragraph A36, wherein the aft fin (72) comprises a housing for one or more antennae.

A38. The aerial vehicle (10) of any of paragraphs A1-A37, wherein one or more of a/the first forward landing arm (18), a/the second forward landing arm (18'), a/the first aft landing arm (20), and a/the second aft landing arm (20') comprises a column, or post.

A39. The aerial vehicle (10) of any of paragraphs A1-A38, wherein one or more of a/the first forward landing arm (18), a/the second forward landing arm (18'), a/the first aft landing arm (20), and a/the second aft landing arm (20') comprises a bar linkage mechanism.

A40. The aerial vehicle (10) of any of paragraphs A1-A39, wherein one or more of a/the first forward landing arm (18), a/the second forward landing arm (18'), a/the first aft landing arm (20), and a/the second aft landing arm (20') comprises a landing foot (80) configured to engage a/the landing surface when the aerial vehicle (10) is in the VTOL configuration and lands on the landing surface.

A41. The aerial vehicle (10) of paragraph A40, wherein the foot (80) comprises a column end, a mid-member of a/the bar linkage mechanism, a wheel, a skid (84), a grip, a talon (86), and/or a ball bearing.

A42. The aerial vehicle (10) of paragraph A40 or A41, wherein each foot (80) is configured to engage a respective one of a/the first forward elongated member (22), a/the second forward elongated member (22'), a/the first aft elongated member (24), and/or a/the second aft elongated member (24'), when the aerial vehicle (10) is in the fixed wing flight configuration.

A43. The aerial vehicle (10) of any of paragraphs A40-A42, wherein the foot (80) comprises a cut-out (88) shape configured to accommodate a respective one of a/the first forward elongated member (22), a/the second forward elongated member (22'), a/the first aft elongated member (24), and/or a/the second aft elongated member (24'), when the aerial vehicle (10) is in the fixed wing flight configuration.

A44. The aerial vehicle (10) of any of paragraphs A1-A43, wherein the forward propeller (12) and the forward landing arm (18) are coupled to a/the forward elongated member (22) by a forward revolution joint (90).

A45. The aerial vehicle (10) of any of paragraphs A1-A44, wherein the aft propeller (14) and the aft landing arm (20) are coupled to a/the aft elongated member (24) by an aft revolution joint (92).

A46. The aerial vehicle (10) of any of paragraphs A1-A45, wherein tilting of the forward propeller (12) and the forward landing arm (18) is determined by a mechanism actuated by an electromagnetic motor, a hydraulic actuation system, and/or a pneumatic actuation system.

A47. The aerial vehicle (10) of any of paragraphs A1-A46, wherein tilting (104) of the aft propeller (14) and the aft landing arm (20) is determined by a/the mechanism actuated by an/the electromagnetic motor, a/the hydraulic actuation system, and/or a/the pneumatic actuation system.

B1. A method (100), comprising:
configuring (102) an aerial vehicle (10) for vertical take-off or landing, wherein the configuring (102) comprises positioning at least one landing arm (18, 18', 20, 20') such that it extends downwardly from the aerial vehicle (10); and
tilting (104) the at least one landing arm (18, 18', 20, 20') together with at least one propeller (12, 12', 14, 14') to configure the aerial vehicle (10) for fixed wing flight, wherein each respective landing arm (18, 18', 20, 20') of the at least one landing arm (18, 18', 20, 20') is coupled to a respective propeller (12, 12', 14, 14') of the at least one propeller (12, 12', 14, 14').

B2. The method (100) of paragraph B1, wherein the aerial vehicle (10) comprises the aerial vehicle (10) of any of paragraphs A1-A47.

B3. The method (100) of any of paragraphs B1-B2, wherein the tilting (104) comprises tilting the at least one landing arm (18, 18', 20, 20') by at least about 90 degrees with respect to the aerial vehicle (10).

B4. The method (100) of any of paragraphs B1-B3, wherein the at least one landing arm (18, 18', 20, 20') and the at least one propeller (12, 12', 14, 14') are coupled to a/the forward elongated member (22) or a/the aft elongated member (24) by a revolution joint (90,92).

B5. The method (100) of any of paragraphs B1-B4, wherein the tilting (104) is determined by a mechanism actuated by an electromagnetic motor, a hydraulic actuation system, and/or a pneumatic actuation system.

B6 The method (100) of any of paragraphs B1-B5, further comprising again configuring (102) the aerial vehicle (10) for vertical takeoff or landing, after the tilting (104) to configure the aerial vehicle (10) for fixed wing flight.

C1. The use of the aerial vehicle (10) of any of paragraphs A1-A47 to reduce and/or minimize drag in the aerial vehicle (10).

C2. The use of the aerial vehicle (10) of any of paragraphs A1-A47 to perform package delivery, monitoring, search and rescue operations, surface searches, communications, recovery operations, and/or data collection.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. An aerial vehicle configured to be selectively transitioned between a fixed wing flight configuration and a vertical takeoff and landing (VTOL) configuration, the aerial vehicle comprising:
 a forward propeller configured to rotate when the aerial vehicle is in the fixed wing flight configuration and when the aerial vehicle is in the VTOL configuration, wherein in the fixed wing flight configuration the forward propeller rotates in a first forward plane, wherein in the VTOL configuration the forward propeller rotates in a second forward plane, and wherein the first forward plane is arranged at a first non-parallel angle with respect to the second forward plane;
 an aft propeller configured to rotate at least when the aerial vehicle is in the VTOL configuration;
 a forward landing arm, wherein the forward landing arm is configured to be tilted to a stowed position when the aerial vehicle is in the fixed wing flight configuration, wherein the forward landing arm produces less drag in the stowed position than when the aerial vehicle is in the VTOL configuration, and wherein the forward landing arm is coupled to the forward propeller such that tilting of the forward propeller causes corresponding tilting of the forward landing arm;
 a forward elongated member, wherein the forward propeller is coupled to the forward elongated member, wherein the forward landing arm is engaged with, secured against, and at least substantially parallel to the forward elongated member when the aerial vehicle is in the fixed wing flight configuration and the forward landing arm is in the stowed position; and
 an aft landing arm, wherein the forward landing arm and the aft landing arm are configured to extend downwardly when the aerial vehicle is in the VTOL configuration, such that the forward landing arm and the aft landing arm at least partially support the aerial vehicle when the aerial vehicle is in the VTOL configuration and lands on a landing surface.

2. The aerial vehicle according to claim 1, wherein the aft propeller rotates in a first aft plane when the aerial vehicle is in the fixed wing flight configuration, wherein the aft propeller is tilted when the aerial vehicle is in the VTOL configuration such that the aft propeller rotates in a second aft plane, and wherein the first aft plane is arranged at a second non-parallel angle with respect to the second aft plane.

3. The aerial vehicle according to claim 2, wherein the aft landing arm is coupled to the aft propeller such that tilting of the aft propeller causes corresponding tilting of the aft landing arm.

4. The aerial vehicle according to claim 3, further comprising
 an aft elongated member, wherein the aft propeller is coupled to the aft elongated member.

5. The aerial vehicle according to claim 4, wherein the aft landing arm is engaged with and at least substantially parallel to the aft elongated member when the aerial vehicle is in the fixed wing flight configuration.

6. The aerial vehicle according to claim 4, wherein the forward elongated member is integrally formed with the aft elongated member such that the aerial vehicle comprises a lift boom that forms the forward elongated member and the aft elongated member, wherein the lift boom extends from a leading edge region to a trailing edge region, wherein the forward propeller is coupled within the leading edge region of the lift boom, and wherein the aft propeller is coupled within the trailing edge region of the lift boom.

7. The aerial vehicle according to claim 1, wherein in the VTOL configuration, a lower end of each of the forward landing arm and the aft landing arm is oriented facing a landing surface on which the aerial vehicle is configured to land, and wherein in the fixed wing flight configuration, the lower end of each of the forward landing arm and the aft landing arm is angled away from the landing surface on which the aerial vehicle is configured to land.

8. The aerial vehicle according to claim 1, wherein the forward landing arm is at least substantially fixed with respect to the forward propeller, and wherein the aft landing arm is at least substantially fixed with respect to the aft propeller.

9. The aerial vehicle according to claim 1, wherein the forward propeller comprises a first forward propeller, wherein the aft propeller comprises a first aft propeller, wherein the forward landing arm comprises a first forward landing arm, wherein the aft landing arm comprises a first aft landing arm, and wherein the aerial vehicle further comprises:
a second forward propeller;
a second aft propeller;
a second forward landing arm coupled to the second forward propeller; and
a second aft landing arm coupled to the second aft propeller.

10. The aerial vehicle according to claim 9, wherein the first forward propeller, the second forward propeller, the first aft propeller, and the second aft propeller are all configured to spin when the aerial vehicle is in the fixed wing flight configuration.

11. The aerial vehicle according to claim 9, wherein the first aft propeller and the second aft propeller are configured to spin in a respective reverse direction in the VTOL configuration than in the fixed wing flight configuration.

12. The aerial vehicle according to claim 9, wherein the first forward propeller, the second forward propeller, the first aft propeller, and the second aft propeller are all configured to spin when the aerial vehicle is in the VTOL configuration, wherein only the first forward propeller and the second forward propeller are configured to spin in the fixed wing flight configuration, and wherein the first aft propeller and the second aft propeller are substantially stationary such that blades of the first aft propeller and blades of the second aft propeller are oriented at least substantially parallel to an air direction of the aerial vehicle when the aerial vehicle is in the fixed wing flight configuration.

13. The aerial vehicle according to claim 9, wherein the first aft propeller and the second aft propeller comprise spring-loaded folding blades that fold when the aerial vehicle is in the fixed wing flight configuration.

14. The aerial vehicle according to claim 9, wherein the forward elongated member comprises a first forward elongated member and a second forward elongated member, wherein the first forward propeller is directly coupled to the first forward elongated member, wherein the second forward propeller is directly coupled to the second forward elongated member, wherein the first aft propeller is directly coupled to a first aft elongated member, and wherein the second aft propeller is directly coupled to a second aft elongated member.

15. The aerial vehicle according to claim 9, wherein the first aft landing arm is coupled to the first aft propeller such that the first aft landing arm spins with the first aft propeller, and wherein the second aft landing arm is coupled to the second aft propeller such that the second aft landing arm spins with the second aft propeller.

16. The aerial vehicle according to claim 1, wherein the aft landing arm comprises an aft fin extending downwardly from a vertical stabilizer of the aerial vehicle.

17. The aerial vehicle according to claim 9, wherein one or more of the first forward landing arm, the second forward landing arm, the first aft landing arm, and the second aft landing arm comprises one or more selected from the group consisting of a column, a post, and a bar linkage mechanism.

18. The aerial vehicle according to claim 9, wherein one or more of the first forward landing arm, the second forward landing arm, the first aft landing arm, and the second aft landing arm comprises a landing foot configured to engage a landing surface when the aerial vehicle is in the VTOL configuration and lands on the landing surface, and wherein the landing foot comprises a column end, a mid-member of a/the bar linkage mechanism, a wheel, a skid, a grip, a talon, and/or a ball bearing.

19. The aerial vehicle according to claim 18, wherein the forward elongated member comprises a first forward elongated member and a second forward elongated member, wherein each landing foot is configured to engage a respective one of the first forward elongated member to which the first forward propeller is coupled, the second forward elongated member to which the second forward propeller is coupled, a first aft elongated member to which the first aft propeller is coupled, and/or a second aft elongated member to which the second aft propeller is coupled, when the aerial vehicle is in the fixed wing flight configuration.

20. A method, comprising:
configuring the aerial vehicle according to claim 1 for vertical takeoff or landing, wherein the configuring comprises positioning at least one landing arm such that it extends downwardly from the aerial vehicle; and
tilting the at least one landing arm together with at least one propeller to configure the aerial vehicle for fixed wing flight, wherein each respective landing arm of the at least one landing arm is coupled to a respective propeller of the at least one propeller.

* * * * *